United States Patent
Budka et al.

(10) Patent No.: US 6,952,591 B2
(45) Date of Patent: Oct. 4, 2005

(54) UPLINK POWER CONTROL ALGORITHM

(75) Inventors: Kenneth C. Budka, Marlboro, NJ (US); Arnab Das, Old Bridge, NJ (US); Kamala Murti, Morganville, NJ (US); Yinglu Zhang, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 643 days.

(21) Appl. No.: 09/989,335

(22) Filed: Nov. 20, 2001

(65) Prior Publication Data

US 2003/0109274 A1 Jun. 12, 2003

(51) Int. Cl.[7] ................................................. H04Q 7/20
(52) U.S. Cl. ........................ 455/517; 455/69; 455/67.11
(58) Field of Search ............................ 455/522, 68, 69, 455/88, 561, 517, 67.11; 375/146, 135, 295, 297, 358; 370/310, 346, 328

(56) References Cited

U.S. PATENT DOCUMENTS

| | | | | |
|---|---|---|---|---|
| 5,590,408 A | * | 12/1996 | Weiland et al. ............... 455/69 |
| 6,731,617 B1 | * | 5/2004 | Mizell et al. ................ 370/328 |
| 2002/0021682 A1 | * | 2/2002 | Ariyoshi et al. ......... 455/522 X |
| 2003/0036403 A1 | * | 2/2003 | Shiu et al. ................... 455/522 |
| 2003/0207695 A1 | * | 11/2003 | Chang et al. ................ 455/522 |
| 2004/0157636 A1 | * | 8/2004 | Koo et al. .................... 455/522 |

* cited by examiner

Primary Examiner—Nay Maung
Assistant Examiner—Philip J Sobutka

(57) ABSTRACT

In a system having a base station transmitter for transmitting data blocks to one or more mobile stations over a radio link, there is a method for determining an uplink transmit power level at which to transmit a current data block over a radio link from the mobile to the base transmitter station. The method evaluates airlink quality measurements in the radio link over a measurement interval, wherein each time a message is sent to the mobile station, it is evaluated whether a specified number of uplink blocks have transmitted by the mobile station since the start of the measurement interval. Based on the evaluated airlink quality measurement, the method determines the uplink transmit power level that the mobile should be using for the current block, and adjusts the transmit power level, if necessary, for the current block.

31 Claims, 19 Drawing Sheets

UPLINK POWER CONTROL ALGORITHM

BACKGROUND OF THE INVENTION

1. Field of the Invention

The present invention relates to wireless communications and, in particular, to a technique for determining uplink power used for transmissions between a base station of a system such as the general packet radio service (GPRS) system and one or more mobile stations of the system.

2. Description of Related Art

A variety of wireless communications systems are increasingly being employed. In cellular systems, for example, a network of base transceiver stations (BTS) is used to provide wireless links with mobile stations or units (e.g., cell phones). The mobile stations, sometimes referred to simply as mobiles, typically communicate via either analog or digital modulated radio frequency (RF) signals with the base station, which is itself connected to an external telephone or data network.

A variety of digital cellular networks and telecommunications standards are in use, such as GSM (Global System for Mobile Communication), and GSM derivatives (e.g., DCS 1800, PCS 1900, etc.). GPRS is an emerging standard that adds general Internet Protocol (IP) data communication, such as high-speed Internet and email data services, to GSM networks. GPRS uses a packet-mode technique to transfer high-speed and low-speed data and signaling in an efficient manner over GSM radio networks. The packet radio principle of GPRS can be used for carrying end user's packet data protocol (such as IP and X.25) information from/to a GPRS terminals to/from other GPRS terminals and/or external packet data networks. GPRS is defined by various ETSI (European Telecommunications Standards Institute) specifications such as ETSI GSM 05.08 version 6.5.0 Release 1997, "Digital cellular telecommunications; system (Phase 2+); Radio subsystem link control"; and ETSI GSM 04.60 version 6.4.0 Release 1997, "Digital cellular telecommunications system (Phase 2+); General Packet Radio Service (GPRS); Mobile Station (MS)—Base Station System (BSS) interface; Radio Link Control/Medium Access Control (RLC/MAC) protocol." See <http://www.etsi.org>.

GPRS uses a time division multiple access (TDMA) scheme. In a TDMA scheme, over a given RF channel, each mobile station in a cell transmits and receives (to and from the base station) audio data and non-audio data packets during dedicated time slices or time slots within an overall TDMA cycle or epoch. Other communications schemes include frequency division multiple access (FDMA), code division multiple access (CDMA), and combinations of such schemes. In GPRS, the allocation of GPRS radio channels is flexible: from 1 to 8 radio interface timeslots can be allocated per TDMA frame. Timeslots are shared by the active users, and uplink and downlink timeslots are allocated separately. The downlink refers to transmissions from the BTS to one or more mobile stations, while uplink refers to transmissions received by the BTS. The radio interface resources can be shared dynamically between speech and data services as a function of service load and operator preference. Various radio channel coding schemes are specified to allow bit rates from 9 to more than 150 kbit/s per user.

In GPRS systems, timeslots are further subdivided into blocks. For example, one block of data is transmitted by a base station on a timeslot every 20 ms. These data blocks, sometimes referred to as RLC/MAC blocks, contain a number of bits of data (e.g., 456 physical layer bits). A block can be intended for a particular mobile station. In addition, each block contains a header containing control information called the uplink state flag that must be decoded by all mobiles in the cell of the BTS which are sending data uplink.

To exploit the wide range of carrier-to-interference (C/I) ratios available at different locations within a cell, GPRS networks employ four different airlink coding schemes. GPRS's "lowest rate" code, CS-1, employs a relatively high number of redundancy bits and offers a maximum LLC-layer throughput of 8 kbps/timeslot. The high level of redundancy present in blocks encoded using CS-1 ensures that mobile stations at the fringes of a cell, where C/I levels are typically lowest, are able to send and receive data. In contrast, the "highest rate" code, CS-4, offers maximum LLC-layer throughputs of 20 kbps/timeslot. Because of the small number of redundancy bits added to each block encoded with CS-4, however, airlink errors can be detected, but not corrected. As a result, CS-4 offers the best airlink performance at relatively high C/I ratios. The remaining two GPRS coding schemes offer maximum LLC-layer throughputs of 12 kbps/timeslot (CS-2) and 14.4 kbps/timeslot (CS-3).

By monitoring the quality of the airlink, mobile stations and the GPRS network can select the coding scheme that offers the best performance. The process of dynamically selecting the coding scheme based on airlink quality is called link adaptation. Quality can be measured, for example, by measuring the bit error rate (BER) or block error rate (BLER) of the channel.

Dynamic power control is an important tool for mitigating co-channel interference in wireless networks. In GPRS networks, keeping co-channel interference levels low holds the promise that high rate coding schemes can be used over the airlink. The lower interference levels achieved by power control can result in higher airlink throughputs over larger portions of the cell, potentially increasing a cell's data traffic carrying capacity. Effective GPRS power control also ensures that timeslots used for GPRS do not cause unacceptable levels of interference to timeslots used for voice calls in co-channel neighbor cells.

Circuit-switched (e.g., voice) GSM and GPRS use airlink resources in dramatically different ways. Circuit-switched GSM mobile stations have dedicated use of a single timeslot (or half a timeslot, for halfrate users) for the entire duration of a call-periods of time that typically last tens of seconds to minutes. Additionally, these circuit-switched GSM mobile stations report channel quality measurements roughly twice a second.

In contrast, GPRS users share a single timeslot simultaneously with several users in a cell. A single user may transmit and receive GPRS data over multiple timeslots simultaneously. GPRS radio link connections, known as temporary block flows (TBFs), can be short-lived, lasting less than a few hundred milliseconds. GPRS mobile stations report downlink airlink quality measurements in RLC/MAC acknowledgement messages, typically in response to being polled by the base station setting a poll bit in a downlink block. Since the GPRS network is free to poll for these acknowledgement messages at will, airlink quality measurement reports sent by GPRS users will tend to be more sporadic than in circuit-switched GSM networks.

Power control "mistakes" in circuit-switched GSM and GPRS have different consequences. Inadequate-power control for circuit-switched calls can lead to dropped calls, service disruptions which are extremely annoying for users and network operators alike. Inadequate power control for GPRS mobile-stations can cause high BLERs (block error rates), or, at worst, broken TBFs. Power control errors in GPRS networks increase packet delays and decrease user throughputs, thus causing service degradation rather than wholesale service disruption.

GPRS's uplink power control mechanisms allow the network to tune the uplink transmit power used by each mobile station transmitting uplink RLC/MAC blocks. Uplink power control provides an important added benefit: transmit power used by each GPRS mobile station can be reduced to levels adequate to achieve proper airlink performance, and no higher. Transmit power can be kept as low as possible without sacrificing airlink throughput, giving users peak airlink performance without unnecessarily draining the mobile station's battery.

SUMMARY OF THE INVENTION

Based on the above, the present invention provides a system having a base station transmitter for transmitting data blocks to one or more mobile stations over a radio link, in which there is a method for determining an uplink transmit power level at which to transmit a current data block over a radio link from the mobile to the base transmitter station. The method evaluates airlink quality measurements in the radio link over a measurement interval, wherein each time a message is sent to the mobile station, it is evaluated whether a specified number of uplink blocks have been transmitted by the mobile station since the start of the measurement interval. Based on the evaluated airlink quality measurement, the method determines the uplink transmit power level that the mobile should be using for the current block, and adjusts the transmit power level, if necessary, for the current block.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

Figure 1:
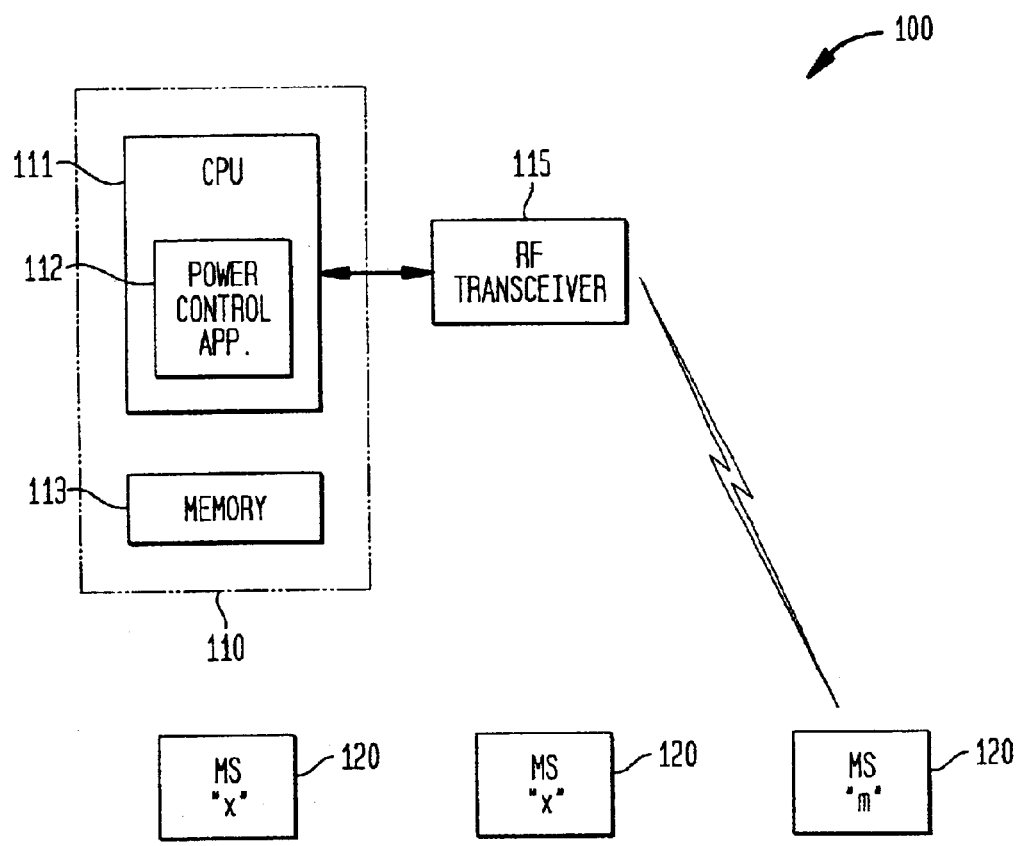
FIG. 1 is a block diagram of a wireless communications system in accordance with an embodiment of the present invention.

In the present invention, a GPRS uplink power control method is provided to control the power used for uplink transmissions of each block. The GPRS uplink power control method of the present invention operates, in a preferred embodiment, within the GPRS power control framework outlined in the ETSI GPRS 05.08 system specification, described above.

The uplink power control algorithm of the present invention uses a traditional measurement-control paradigm. The quality of an airlink is assessed over a series of successive measurement intervals. Each time an uplink acknowledgement/negative acknowledgement (ACK/NACK) message is sent to a mobile station, the algorithm evaluates whether enough uplink blocks have been transmitted by the mobile station since the start of the measurement interval. This is to determine the power level the mobile should be using.

If a determination can be made, power control parameters included in the ACK/NACK are updated, and a new measurement interval begins. If the interval has lasted beyond a known or suitable duration, transmission of an uplink ACK/NACK message may also trigger the end of a measurement interval. In this case, the measurements taken over the measurement interval may no longer reflect the current quality of the channel. To compensate for this uncertainty, the mobile's transmit power is increased to at most a predetermined maximum power level, and a new measurement interval begins.

At the end of a measurement interval, the uplink power control algorithm uses both BER-based and block error rate (BLER)-based power step estimation techniques to determine how much to adjust the mobile station's transmit power:

(1) When block error rates are suitably low over a measurement interval, the algorithm estimates the power step needed to achieve the desired quality using the BER-based power-step estimation technique.
(2) When block error rates are high, the algorithm estimates the power step needed to achieve the desired quality range using the BLER-based power step estimation technique.
(3) At moderate BLERs, where neither estimation technique dominates the other (this occurs, for example, in region B of FIG. 4), the algorithm estimates the power reduction step by taking the average of the BLER-based and BER-based estimates. To be conservative, if the average suggests an increase in power, an increase in power is made. If the average suggests the power should be decreased, no change is made to the mobile transmit power.

Preferably, GPRS power control should err on the conservative side, when appropriate. When the calculated power step results in an increase in mobile transmit power, the mobile is commanded to increase its transmit power by the total step. When the power step results in a decrease in mobile transmit power, the algorithm commands the mobile to reduce its power by a fraction of the estimate. This fraction is a tunable parameter. This way, power may be conservatively reduced when quality is good, and quickly increased when quality is bad. Reducing the transmit power by only a fraction of the estimated step provides an algorithm that is more robust to estimation errors and to short term fluctuations in channel quality.

The uplink power control algorithm of the present invention provides for lower co-channel interference between channels in the mobile station. Additionally, mobile station performance is improved at the boundaries of a cell in which the mobile resides. Further, the present invention provides a potential increase in the capacity handled within a GPRS system. Moreover, there is an increase in mobile battery life as a result of the algorithm, and the implementation of the algorithm may reduce the impact on existing circuit-switched GSM voice traffic. These and other details, advantages, and embodiments of the present invention are described in further detail below with respect to FIGS. 1–20.

Referring now to FIG. 1, there, is shown a block diagram of a wireless communications system 100 in accordance with an embodiment of the present invention. System 100 may be a cellular portion of a GPRS system, for example, and comprises base transceiver station (BTS) 110 and a plurality of mobile stations or units 120. Mobile stations 120 include a particular mobile station m and other mobile stations x. BTS 110 includes an RF transceiver (transmitter/receiver) 115 coupled to a computer having CPU 111 and memory 113.

CPU 111 runs a power control application 112 in accordance with the present invention, which determines the transmit power to be used before each uplink block is transmitted from the mobile stations 120 to the BTS 110. CPU 111 and its power control application 112, which run the uplink power control algorithm of the present invention, are also frequently and collectively referred to hereinafter as a remote packet control unit (rPCU). CPU 111 also runs a suitable RLC/MAC application (not shown) which segments packets received from an external network into downlink blocks, and also reassembles packets from uplink blocks received from mobile stations.

The base station transmit power is set as low as possible, but high enough so that any destination mobile m will be able to successfully decode the block with acceptable BLER, and so that any other mobiles in the cell of the BTS which are sending data uplink can successfully decode the uplink state flag of the block with an acceptable error rate.

Power control application 112 evaluates whether enough uplink blocks have been transmitted by the mobile station since the start of the measurement interval. This is to determine the power level the mobile m should be using.

If power level has been determined, application 112 updates power control parameters and sends an updated power level command to the mobile station, and a new measurement interval begins. If the interval lasts too long and application 112 determines that measurements taken over the measurement interval may no longer reflect the current quality of the channel, application 112 increases the mobile station m's transmit power to a predetermined maximum power level, so that a new measurement interval begins.

Interactions Between Power Control and Link Adaptation

A GPRS network includes two tools to combat high airlink BLERs:
(1) Power: The network can increase transmit power, provided the mobile or network aren't already transmitting at maximum power levels. (CS-1 is the strongest code provided by GPRS.)
(2) Parity: The network can select a coding scheme with a larger number of parity bits per block, provided CS-1 isn't currently being used over the airlink.

Link adaptation and power control algorithms are necessarily based on a common assumption: channel conditions caused by path loss, shadow fading and interference in the near future will be similar to those observed in the recent past. If sufficient care isn't taken, however, power control and link adaptation algorithms can work against one another. Consider, for example, the consequences of a decision by a link adaptation algorithm to jump from CS-1 to CS-3 without taking into account the effects of a simultaneous 10 dB drop in transmit power commanded by a power control algorithm.

The inventors address these interactions by allowing the link adaptation algorithm to be loosely coupled with closed-loop power control. Power control algorithms adjust power in attempt to maintain channel quality within a desired quality range. For example, the GPRS closed-loop uplink power control algorithm of the present invention attempts to keep the uplink channel BER within a desired range. When BERs are lower than the target BER range and the mobile is not already using minimum transmit power, the uplink power control algorithm will decrease the mobile's transmit power. When BERs are higher than the target bit error rate range and the mobile is not already using maximum uplink transmission power, the uplink power control algorithm will command the mobile to increase transmit power.

Figure 2:
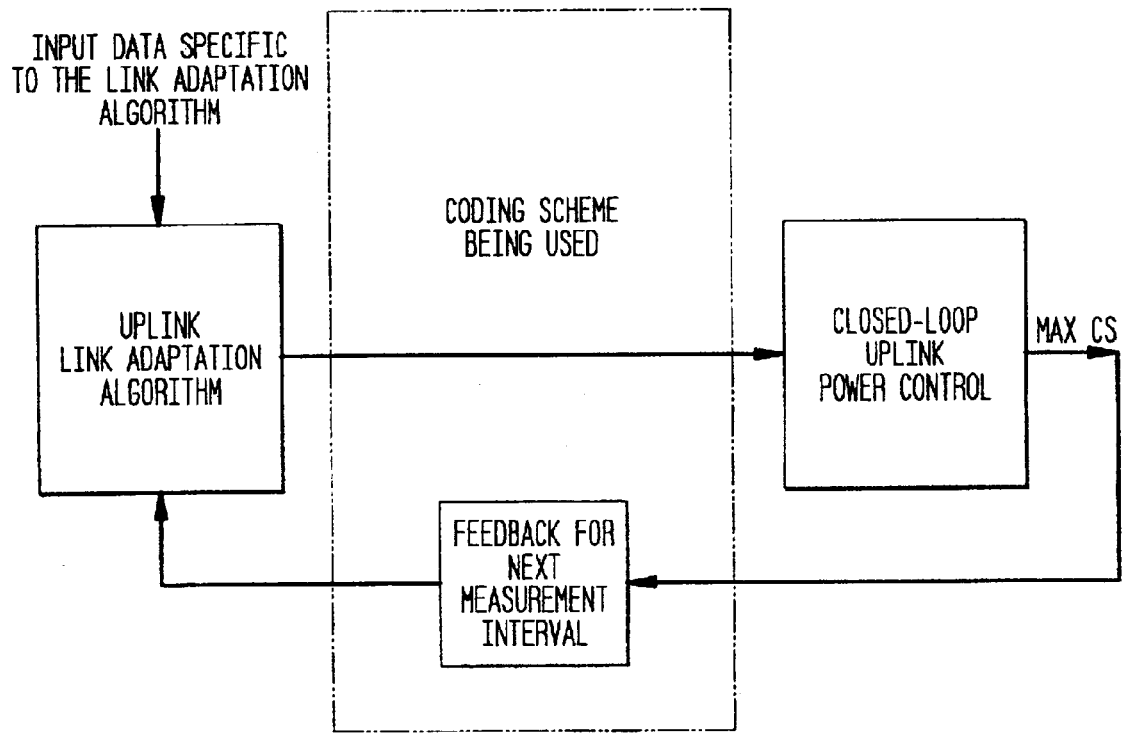
FIG. 2 illustrates the relationship between closed-loop power control and link adaptation in the present invention.

FIG. 2 illustrates the relationship between closed-loop power control and link adaptation in the present invention, and specifically depicts the loose coupling required between closed-loop power control and link adaptation. The basic idea behind the interaction is as follows. The link adaptation algorithm informs the power control algorithm about the weakest coding scheme which may be used over the airlink in the next measurement interval. The power control algorithm then selects the target bit error rate, or equivalently, the target C/I, accordingly.

Next, the power control algorithm sets a flag, denoted $CS_3CS_4$flag, when the attenuation to be used for the next measurement interval exceeds a pre-determined threshold. When this flag is set, it indicates that the transmit power level is low, and so, the interference being caused to neighboring cells is also low. At such times, the link adaptation algorithm should be allowed to take advantage of BERs falling below the target, and also to use coding schemes that result in high throughput, such as CS-3 and CS-4. If, on the other hand, the flag is not set, then the transmit power is high, and the link adaptation algorithm is restricted to using coding schemes which require low C/I, such as CS-1 and CS-2.

Terms Acronyms and Abbreviations

The following are listed various terms, acronyms and abbreviations used in this application.

| | |
|---|---|
| Ack | Acknowledgment |
| BCCH | Broadcast Common Control Channel |
| BER | Bit Error Rate |
| BLER | Block Error Rate |
| BTS | Base Transceiver Station |
| C/I | Carrier to Interference ratio |
| CS-x | Coding Scheme-x (x = 1,2,3,4) |
| dB | Decibels |
| downlink | The base station→mobile station communications channel |
| FH | Frequency Hopping |
| GPRS | General Packet Radio Service |
| GSM | Global System for Mobile Communication |
| kbps | Kilobits per second |
| LLC | Logical Link Control |
| MAC | Medium Access Control |
| MS | Mobile Station |
| Nack | Negative acknowledgement |
| OS | Operating System |
| PACCH | Packet Associated Control Channel |
| PBCCH | Packet Broadcast Control Channel |
| PCU | Packet Control Unit |
| PDCH | Packet Data Channel |
| PTCCH | Packet Timing Control Channel |
| RA | Rural Area |
| RLC | Radio Link Control |
| rPCU | Remote Packet Control Unit |
| TBF | Temporary Block Flow |
| TDMA | Time Division Multiple Access |
| TU | Typical Urban |
| Uplink | mobile station→base station communications channel |
| ULPCA | Uplink Power Control Algorithm |
| USF | Uplink State Flag |

GPRS' Uplink Power Control Mechanism at the MS

The RF output power, $P_{CH}$, used by a mobile station on each uplink PDCH is given by the following expression (1):

$$P_{CH} = \min\{\Gamma_0 - \Gamma_{CH} - \alpha \cdot (C+48), PMAX\} \quad (1)$$

where $\Gamma_{CH}$ is a control parameter calculated by the uplink power control algorithm and sent by the rPCU to each mobile station in RLC control messages and $\Gamma_0$ is a system constant (translation parameter). The parameter may be set to 39 dBm for GSM900 systems, and 36 dBm for GSM1800 systems. The parameter $\alpha$ is a system parameter broadcast on the PBCCH or BCCH, or optionally sent to a mobile station in an RLC control message. ($\alpha=0, 0.1, \ldots, 1.0$). C is a moving average estimate of BCCH carrier power maintained by the mobile station. The BCCH and PBCCH are beacon channels broadcast by the base station at constant power. The mobile periodically updates C based on measurements of the BCCH, or, if available, the PBCCH. Finally, PMAX is the maximum allowed output power in the cells.

Figure 3:
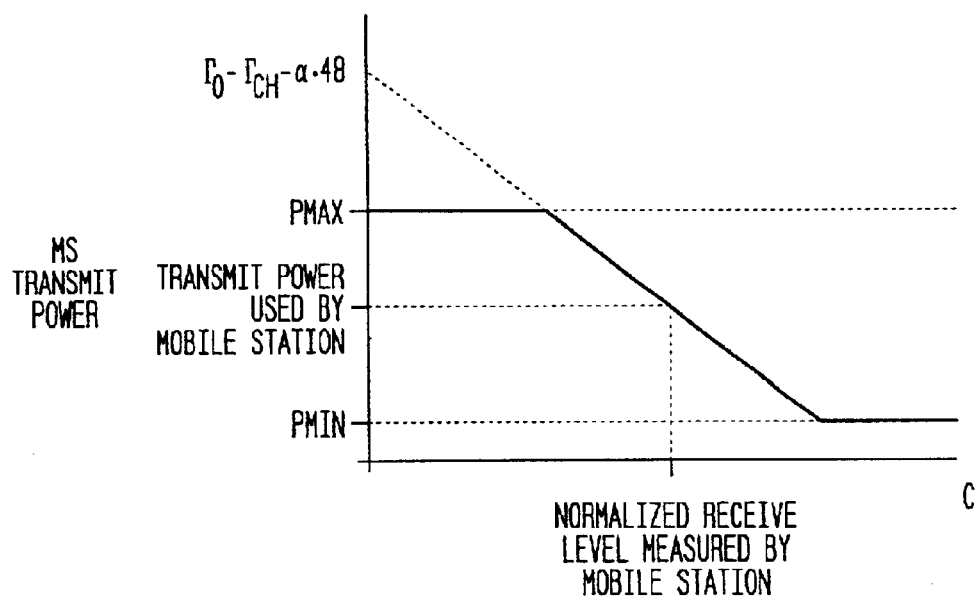
FIG. 3 is a graph illustrating the relationship between a mobile's normalized beacon channel receive level measurement and mobile transmit power.

FIG. 3 is a graph illustrating the relationship between a mobile's normalized beacon channel receive level measurement and mobile transmit power. There is shown a plot of mobile station transmit power as a function of receive level C. When C is low, the signal attenuation between the base station and mobile station is high, and the mobile uses high transmit power. The value of PMAX is used to limit the amount of interference caused by mobiles at the fringes of a cell. High values of C are indicative of low attenuation loss between the mobile station and base transceiver station. At high values of C, therefore, the mobile uses lower transmit power levels.

The parameter $\alpha$ determines the slope of the line in FIG. 3. By increasing (decreasing) $\Gamma_{CH}$ appropriately, the network can cause the mobile station to decrease (increase) its transmit power. When $\alpha=0$, the mobile station transmit power is independent of the mobile station's measured receive level C. Setting $\alpha=0$ results in a pure closed-loop control: the GPRS network controls the mobile station uplink power directly through choice of the parameter $\Gamma_{CH}$. Increasing $\Gamma_{CH}$ by $\Delta$ dB, for example, decreases the mobile stations uplink transmit power by $\Delta$dB.

When $\alpha>0$, mobile transmit power is influenced not only by the network's choice of $\Gamma_{CH}$, but by the mobile station's measured receive level C. Assuming C is slowly varying, increasing $\Gamma_{CH}$ by $\Delta$ dB, will result in a $\Delta$ dB decrease in mobile station transmit power. As will be more fully explained below, tunable system parameters control how long the mobile station's averaging window is for estimating the receive level. The length of the averaging window controls how quickly C fluctuates.

Overview of the Power Control Algorithm

This section presents some generic concepts and principles on which the uplink power control algorithm of the present invention is based. A more detailed description is to be provided hereinafter below.

Figure 4:
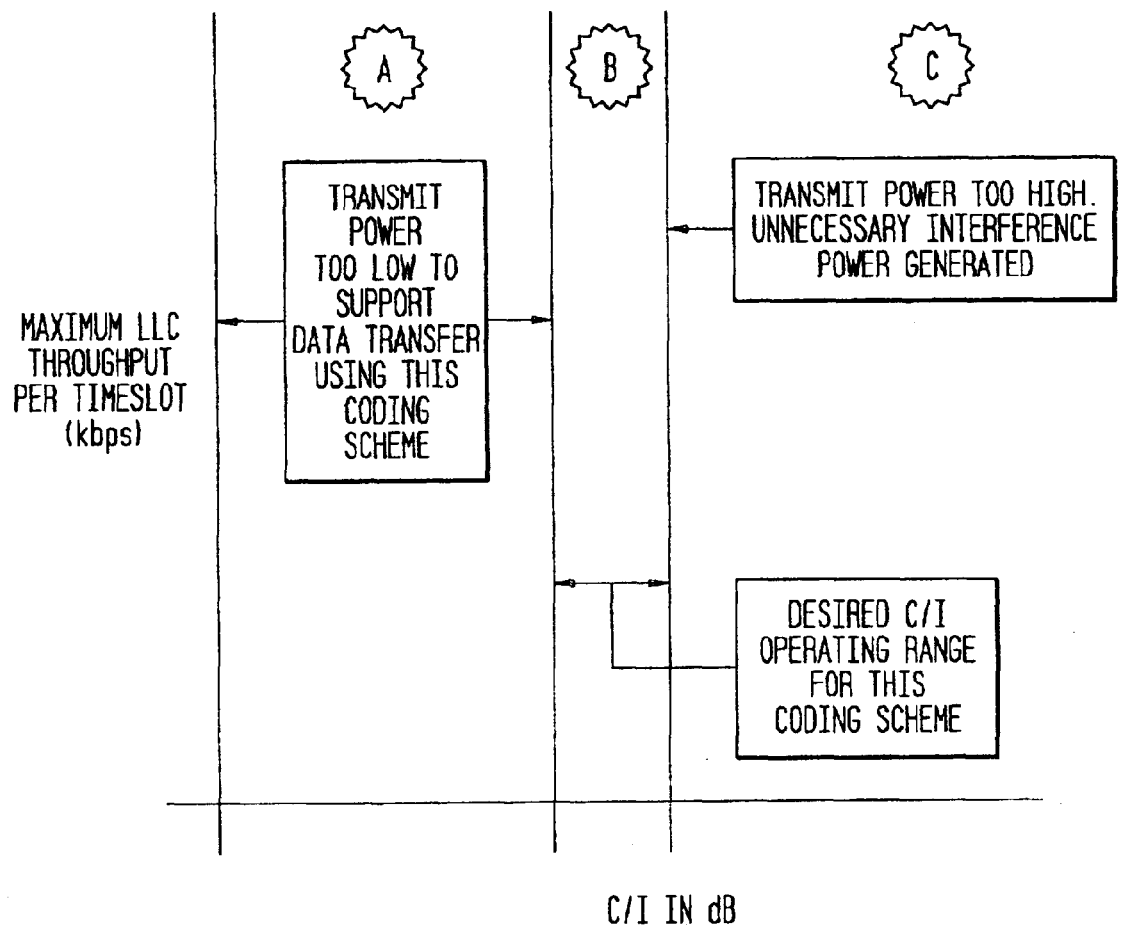
FIG. 4 is a graph illustrating the effect of C/I on the throughput performance of a coding scheme.

FIG. 4 is a graph illustrating the effect of C/I on the throughput performance of a coding scheme. In particular, FIG. 4 shows an idealized plot of maximum logical link control (LLC-layer) throughput as a function of C/I for an arbitrary coding scheme. At low C/I ratios (region A in FIG. 4), BERs are too high to support the use of the coding scheme. Accordingly, in region A a coding scheme employing greater protection against block errors should be used, or mobile station transmit power should be increased.

Region B, the region surrounding the knee of the throughput versus C/I curve, denotes an ideal C/I operating range for the coding scheme. In region B, BLERs are moderate. In region C, the higher transmit powers used by the mobile to achieve higher C/I levels at the base transceiver station do not yield substantial increases in LLC throughput. The additional transmit power, however, generates additional uplink interference to co-channel neighbor cells, and unnecessarily drains the mobile station battery.

FIG. 4 suggests that an uplink power control algorithm should adjust mobile transmit powers to hit a desired range of C/I ratios at the base transceiver station. The appropriate range is a function of the coding scheme in use as well as the propagation environment. But-, fast-, accurate estimates of C/I levels are difficult to obtain in general. However, the relationship between BER and C/I, provides another option.

Figure 5:
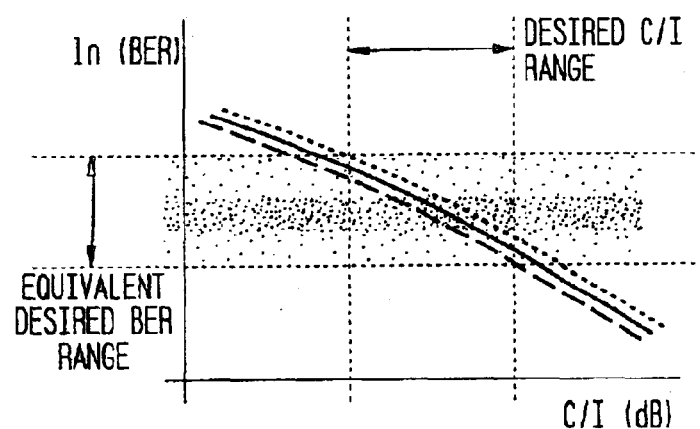
FIG. 5 is a graph showing the relationship between desired uplink C/I range and desired uplink BER range.

FIG. 5 illustrates this relationship between desired C/I range and desired BER range. Specifically, since the relationship between BER and C/I is known, tuning the transmit power to achieve a target C/I range is roughly equivalent to tuning the transmit power to achieve a target BER range. (See FIG. 5.) BER is a direct measure of link quality that can be accurately measured upon receipt of a small number (~5) of uplink blocks. Accordingly, the quality-based uplink power control algorithm of the present invention is based in part on BER measurements (RXQUAL values) reported by the base station in each received block.

Figure 6:
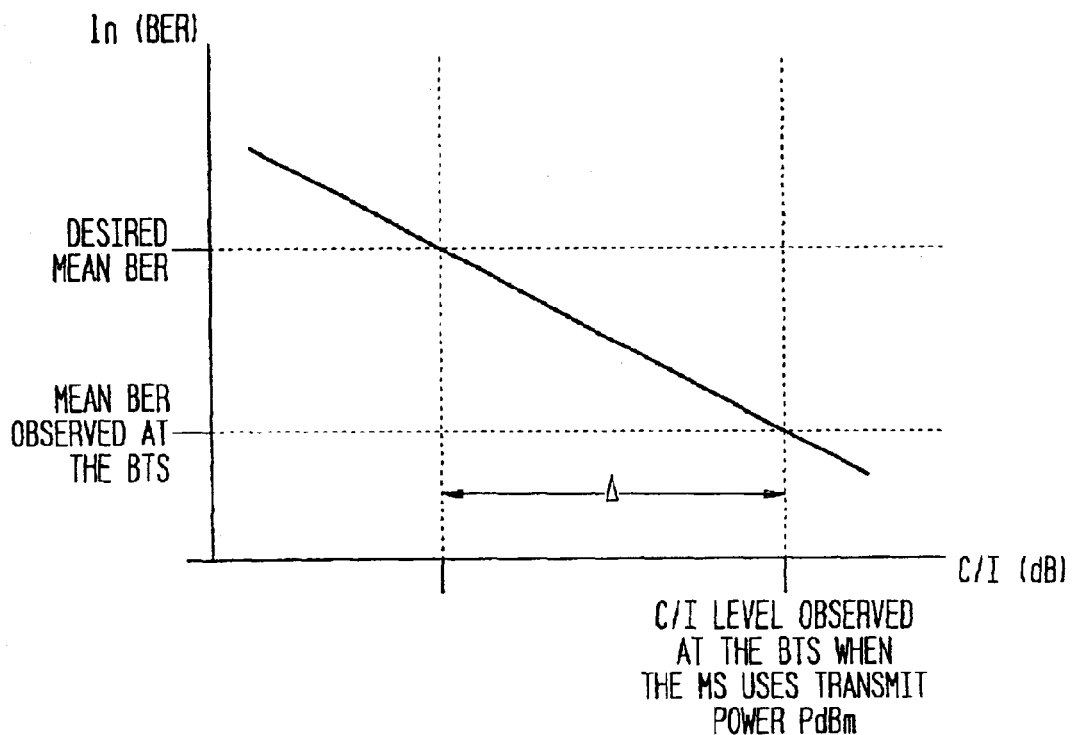
FIG. 6 is a graph showing the relationship between BER measured by a base station and the uplink C/I level measured at the base station.

FIG. 6 illustrates a curve of BER versus C/I. BER measurements also provide a strong indication of how much transmission power should be increased or decreased to achieve desired airlink performance. Assuming that interference power and uplink attenuation caused by environmental effects (path loss and shadow fading) are constant over a short interval, FIG. 6 illustrates how desired transmit power may be inferred from the mean BER when the mobile station uses the same transmit power P dB to send every block to the base transceiver station during the measurement interval.

Therefore, by knowing the relationship between BER and C/I, it is determined that reducing the mobile station's transmit power from P dB to (P–$\Delta$) dB should achieve the desired mean BER. Moreover, the ability to accurately estimate the power reduction level needed to achieve a desired BER is critical to being able to quickly reduce and increase mobile station transmit power. This adjustment relies only on the slope of the BER versus C/I curve, not the intercept. This is important since the intercept is a strong function of the propagation environment (an unknown parameter), whereas the slope of the curve is a known parameter.

In addition to tuning transmission powers to achieve a desired BER range, the uplink power control algorithm determines the C/I (or, equivalently, BER) range that is appropriate for each mobile station. A power control algorithm attempting to achieve C/I levels adequate for CS-3 or CS-4 for mobiles on the fringes of a cell, for example, will likely cause unacceptable levels of interference to co-channel neighbor cells. The target BER range for a given mobile station also depends on the coding scheme being used: High rate codes require lower channel bit error rates, while lower rate codes can operate at higher channel bit error rates.

In an embodiment, a GPRS system is employed in which only CS-1 and CS-2 are supported. This makes determining a target BER range for each mobile station fairly simple. The target C/I range for all mobile stations can be set to roughly 9–12 dB (RXQUAL=5). C/I levels in this range are adequate to support CS-2 in both frequency hopped and non-frequency hopped systems. In addition, in an embodiment the maximum transmit power used by the mobile station (MS) is limited, to avoid excessive interference to timeslots supporting circuit-switched GSM in co-channel neighbor cells.

In an alternative embodiment in which CS-3 is also supported, the above-described approach may be modified to include logic to determine which mobile stations should receive C/I levels adequate for transmission using CS-3. In such an embodiment, the power control algorithm weighs the benefit of the additional throughput for users with the higher C/I levels needed for CS-3, versus the potential degradation in throughput in co-channel neighbor cells caused by the additional interference. Further, the BER-based approach described above may be implemented for GPRS systems employing CS-4, although the BER reported by the BTS when using CS-4 may be meaningless.

Figure 7:
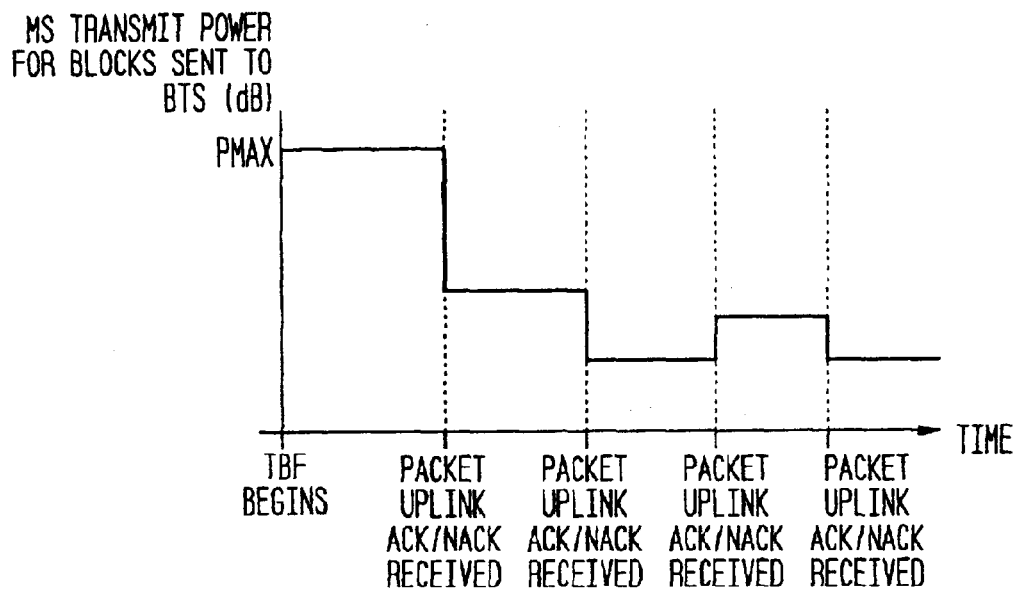
FIG. 7 is a graph showing mobile transmit power adjustments over time for the lifetime of an uplink TBF to illustrate the effect of said adjustments on uplink transmit power.

FIG. 7 is a graph showing mobile transmit power adjustments over time for the lifetime of an uplink TBF to illustrate the effect of said adjustments on uplink transmit power. Specifically, FIG. 7 illustrates the effects of adjustments in control parameter $\Gamma_{CH}$ on uplink transmit power. Over the lifetime of a mobile station's uplink temporary block flow (TBF), the uplink power control algorithm of the present invention adjusts the value of $\Gamma_{CH}$ (the control parameter calculated by the uplink power control algorithm and sent by the rPCU to each mobile station in RLC control messages) in response to BER and BLER values observed during measurement intervals. The effect of these adjustments on uplink transmit power is illustrated in FIG. 7.

As illustrated in FIG. 7, the power adjustments made at the end of each measurement interval can result in substantial reductions in transmit power levels for long-lived TBFs. For TBFs consisting of only a few uplink blocks, however, this mechanism alone will not result in any reduction in uplink transmit power. This is because by the time enough blocks are received to estimate the power step, there may be no more uplink blocks to send to the BTS. Such "short-lived" TBFs will likely be common in GPRS networks. This may be especially true of mobiles receiving large volumes of downlink data over TCP, when frequent uplink TCP acknowledgments may generate frequent, short, uplink TBFs. Hence, additional mechanisms may be necessary to control uplink transmit power to reduce uplink power.

Moreover, data transfer for GPRS applications may tend to be "bursty", i.e., several packets sent over a relatively short period of time. For such applications, the period of time between packets may be long enough for an uplink TBF to be torn down. TBFs for mobiles running such applications will be short-lived. However, once a TBF is torn down, another will likely be set up again soon after.

Figure 8:
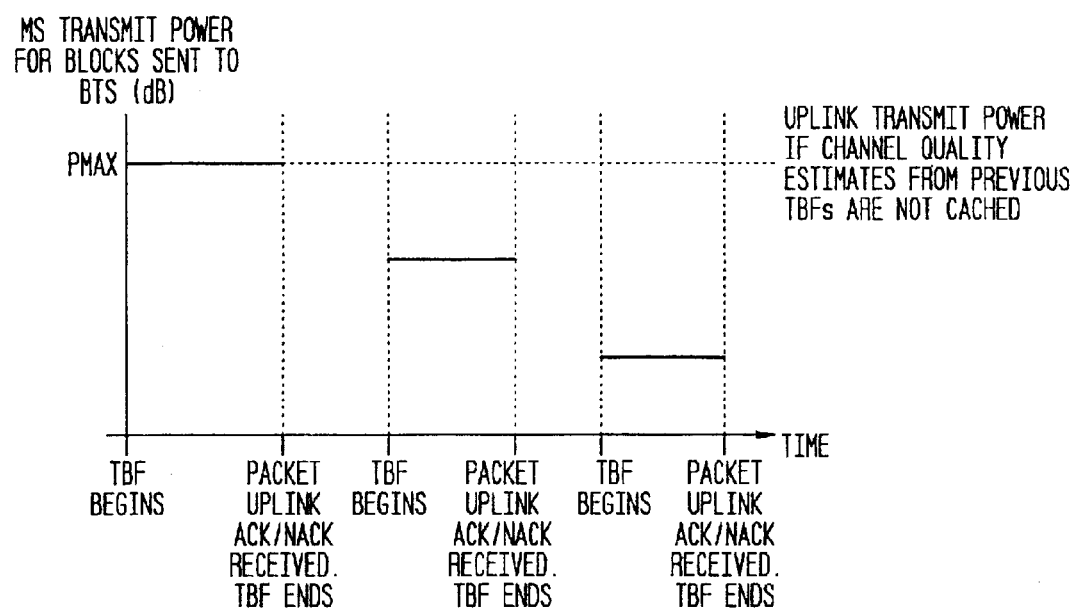
FIG. 8 is a graph illustrating additional reduction in transmit power level using the temporal correlation caching technique of the present invention.

FIG. 8 is a graph illustrating additional reduction in transmit power level using the temporal correlation caching technique of the present invention. In particular, FIG. 8 illustrates potential benefits of caching information on RF channel quality from one TBF to the next. Transmit power reduction may still be possible for users running bursty data applications. Path-loss, shadowing, and interference conditions in the cellular environment tend to be highly correlated over short periods of time (on the order of seconds) on the same carrier (TRX).

As a result of this high correlation, an uplink TBF for mobile station m beginning a short period of time after its previous uplink TBF on the same timeslot on the same TRX should experience similar airlink quality. Accordingly, and as illustrated with reference to FIG. 8, one feature of the uplink power control algorithm takes advantage of this correlation in order to provide potential reductions in transmit power.

At the end of each uplink TBF, the algorithm caches certain power control variables. When a subsequent uplink TBF is established for mobile station m in the same cell and TRX, the parameters and the time of the last update are retrieved from the algorithm's cache. The algorithm adjusts the parameters to account for the time that has elapsed since mobile station m's previous uplink TBF, and uses these adjusted values as initial values for the subsequent TBF. If a suitably long period of time has passed since the previous TBF, or if the previous TBF ended abnormally, the algorithm resets parameters to default values for the subsequent TBF.

Caching can also substantially improve the performance of link adaptation algorithms. Caching the coding scheme used when a TBF ends as well as the power control parameters can help determine a suitable choice for coding scheme to use at the start of subsequent TBFs.

While RF conditions on the same carrier (TRX) tend to show high levels of temporal correlation, RF conditions across TRXs will likely not show the same degree of correlation. Due to the realities of real-world RF planning, different TRXs in a cell may have different sets of co-channel neighbor cells. In addition, the number of timeslots in use at any time in interfering cells can differ widely across TRXs. The caching algorithm takes this into account. Hence, if a TBF for a mobile ends on one TRX, and a subsequent TBF begins on a different TRX, the transmit power used on the old TRX may or may not be sufficient for the new TRX.

Assumptions Underlying the Uplink Power Control Method

An algorithm implementing the uplink power control method of the present invention, is based on the following assumptions:

(1) The algorithm must be computationally efficient. The rPCU in the BTS will need to simultaneously control the power levels of hundreds of mobile stations.

(2) log(BER) is a roughly linear function of C/I (in dB). The slope of the log(BER) vs. C/I (dB) curves is similar for a wide range of propagation environments. Thus, assuming that if an RLC block, encoded using CS–j, is correctly decoded at the receiver, then the observed BER satisfies expression (2):

$$\log(BER) = -\mu \cdot (C/I) + \log(c_j) \quad (2)$$

where $\mu$ and $c_j$ are positive constants. It is also assumed that $\mu$, the slope of the equation, is to be independent of the coding scheme used. As will be seen below, the uplink power control algorithm depends only on $\mu$ and not on $c_j$. It follows from (2) that if $b_j$ is the target BER for CS–j, then the corresponding target C/I, denoted x*, required to achieve $b_j$ satisfies $$\log(b_j) = -\mu x^* + \log(c_j). \quad (3)$$

Plots of log(BER) vs. C/I (dB) performed and analyzed by the inventors indicate that this assumption is valid for high C/I, i.e., C/I>10 dB.

(3) When BLER>10%, BLER is a linear function of C/I (in dB). For each RLC block encoded using CS–j, it holds that $$BLER = -\beta_j \cdot (C/I) + d_j, \quad (4)$$

where $\beta_j$ and $d_j$ are positive constants which depend on the coding scheme used. The uplink power control algorithm depends only on the slope $\beta_j$, and not on $d_j$. If $\beta_j$ denotes the target BLER for CS–j, then the corresponding target C/I, denoted x*, required to achieve $\beta_j$ satisfies expression (5)

$$B_j = -\beta_j x^* + d_j. \quad (5)$$

Plots of BLER vs. C/I (dB) performed and analyzed by the inventors indicate that this assumption is valid for C/I<10 dB. Additionally, it will be shown that expressions (2) and (4) enable the algorithm to quickly tune uplink transmit power to a level that achieves desired airlink quality.

(4) The algorithm must adjust mobile station transmit power quickly. Uplink TBFs may only carry a small number of blocks before they are torn down. When TBF's are short lived, the power control algorithm must adapt quickly in order to realize any significant reduction in transmit power.

(5) All mobiles will be assigned the same value of the uplink power control parameter $\alpha$. This assumption simplifies the design of the algorithm without sacrificing performance.

Uplink Power Control Method: Detailed Discussion

A detailed discussion of an embodiment of the uplink power control method and algorithm of the present invention is provided in this section. Variables to help specify the uplink power control algorithm are summarized in Table 1. Table 2 summarizes the algorithm's tunable parameters. Since airlink performance differs between frequency-hopped and non-frequency hopped systems, the values of some of these tunable parameters may differ depending on whether frequency hopping is being used in the cell.

Additionally, the notation $[x]^+$ is used to denote a mapping of the real number x onto an integer in the set $\{\Gamma_{CH}^{min}, \Gamma_{CH}^{min}+2, \Gamma_{CH}^{min}+4, \ldots, \Gamma_{CH}^{max}\}$ nearest to x. Such a mapping used since mobile transmit power can only be controlled at a granularity of 2 dB, and since it is beneficial for the algorithm to limit the minimum and maximum transmit powers used by a mobile.

TABLE 1

Variables used by the uplink power control algorithm.

| Variable | Units | Definition |
| --- | --- | --- |
| $\Delta(s)$ | dB | Estimated additional uplink attenuation on timeslot s under which mobile station m will experience acceptable RLC/MAC performance.<br>With high probability, an uplink RLC/MAC block from mobile m transmitted at power level $P_{CH}(s) - \Delta(s)$ dB on time slot s will be decoded correctly at the BTS, where $P_{CH}(s)$ denotes the mobile's current transmit power on timeslot s. |
| $\Gamma_{CH}^m(s)$ | dB | Value of $\Gamma_{CH}$ used for mobile m on time slot s. For clarity purposes the superscript is dropped and written simply $\Gamma_{CH}(s)$, when the association of the value of $\Gamma_{CH}$ with mobile m on time slot s is clear from the context. |
| $\Gamma_{CH}^{INIT}(s)$ | dB | Initial value of $\Gamma_{CH}$ assigned to mobile m on time slot s in the assignment message |
| $\Gamma_{CH}^{min}$ | dB | Minimum value of $\Gamma_{CH}$ allowable in the cell;<br>When $\alpha = 0$ in expression (1),<br>$\Gamma_{CH}^{min} = \Gamma_0 - PMAX$; if $\alpha > 0$, $\Gamma_{CH}^{min} = 0$. |
| $N_j(s)$ | Unitless | Number of RLC blocks encoded using CS–j which were received from mobile m on time slot s during the measurement interval. |

TABLE 1-continued

Variables used by the uplink power control algorithm.

| Variable | Units | Definition |
|---|---|---|
| $n_j(s)$ | Unitless | Number of RLC blocks encoded using CS-j (out of $N_j(s)$), received from mobile m on time slot s, which were not in error |
| $k_j(s)$ | Unitless | $k_j(s) = N_j(s) - n_j(s)$. i.e., number of PLC blocks encoded using CS-j (out of $N_j(s)$) received from mobile m on time slot s, which were in error |
| $N_{sum}(s)$ | Unitless | Total number of RLC blocks received from mobile m on time slot s since last update of $\Gamma_{CH}(s)$;<br>$N_{sum}(s) = N_1(s) + N_2(s) + N_3(s) + N_4(s)$ |
| $n_{sum}(s)$ | Unitless | Total number of RLC blocks received on time slot s from mobile m which were not in error;<br>$n_{sum}(s) = n_1(s) + n_2(s) + n_3(s) + n_4(s)$ |
| $k_{sum}(s)$ | Unitless | Total number of RLC blocks received from mobile m on time slot s which were in error;<br>$k_{sum}(s) = k_1(s) + k_2(s) + k_3(s) + k_4(s)$ |
| $\hat{b}(s)$ | Bit errors | Estimated number of bit errors for mobile m on time slot s, calculated over all correctly decoded blocks n(s) during the measurement interval |
| $BLER(s)$ | Block error rate | Estimate of the block error rate on time slot s for mobile m over the measurement interval;<br>$$BLER(s) = \frac{k_{sum}(s)}{N_{sum}(s)}$$ |
| $BLER_w(s)$ | Block error rate | Weighted (or normalized) BLER on time slot s for mobile m defined as<br>$$\frac{2k_1(s) + k_2(s) + 0.8k_3(s) + 0.55k_4(s)}{N_{sum}(s)}.$$<br>In the desired C/I region, CS-2 blocks are roughly twice, CS-3 blocks are roughly 1.25 times and CS-4 blocks are roughly 40/11 times, as likely to be in error compared to CS-1 blocks. This normalization gives an estimate of what the block error would have been if all blocks in a measurement interval were sent using CS-2. |
| $FN^m_{cache}$ | Frame number | Frame number when mobile m's last uplink TBF ended. |
| $FN_o(s)$ | Frame number | Frame number when the last update of $\Gamma_{CH}(s)$ took place for mobile m on time slot s. |
| $FN_{new}(s)$ | Frame number | Frame number when new measurement interval begins for mobile m on time slot s. |
| $FN_c$ | Frame number | Current frame number |
| $\Delta_{64}(s)$ | dBm | Change in $\Gamma_{CH}$ level on timeslot s calculated by the algorithm. |
| $FH\_TRX^m_{curr}$ | Unitless | Indicates whether the current TBF for mobile m is frequency hopping or not |
| $FH\_TRX^m_{cache}$ | Unitless | Indicates whether mobile m's last uplink TBF was frequency hopping or not |
| $FHS\_id^m_{curr}$ | Unitless | FHS id of mobile m's current uplink TBF; applicable only if the current TBF is frequency hopping. |
| $FHS\_id^m_{cache}$ | Unitless | FHS id of mobile m's last uplink TBF; applicable only if the last TBF was frequency hopping. |
| $TRX^m_{curr}$ | Unitless | If mobile m's current TBF is not frequency hopping, then this variable indicates the TRX on which the TBF is established. This variable has no meaning if the current TBF is frequency hopping. |
| $TRX^m_{cache}$ | Unitless | If mobile m's last uplink TBF was not frequency hopping, then this variable indicates the TRX on which the TBF was active. Once again,<br>$TRX^m_{cache}$<br>has no meaning if the last TBF was frequency hopping. |
| IM | dB | Interference margin. This represents the estimated difference in channel quality between a mobile's last active TBF and the current TBF. See Section 0 for additional details. |
| MAX_CS = $f(\Gamma_{CH})$ | Unitless | output of the power control algorithm. When MAX_CS = 1, only CS-1 can be used, and the link adaptation algorithm has no freedom in choosing any other algorithms. When MAX_CS = |

TABLE 1-continued

Variables used by the uplink power control algorithm.

| Variable | Units | Definition |
|---|---|---|
| $f(\Gamma_{CH})$ | Unitless | 2, only CS-1 and CS-2 can be used, and the link adaptation algorithm is restricted to using coding schemes which require low C/I, i.e., CS-1 and CS-2. When MAX_CS = 3, the link adaptation algorithm can choose from coding schemes CS-1–3. When MAX_CS = 4 the link adaptation algorithm is allowed to choose any coding scheme. If constant power is being used, i.e., power control algorithm has been turned OFF, then MAX_CS is set to '0'. The function $f(\Gamma_{CH})$ maps $\Gamma_{CH}$ to the corresponding MAX_CS value. If $$\Gamma_{CH} \leq \Gamma_{ULLA_1},$$ mobile is only allowed to use CS-1, and ULPCA set MAX_CS to 1, i.e., MAX_CS = $f(\Gamma_{CH})$ = 1. If $$\Gamma_{ULLA_1} < \Gamma_{CH} \leq \Gamma_{ULLA_2},$$ mobile is allowed to use CS-1 and CS-2, and ULPCA set MAX_CS to 2, i.e., MAX_CS = $f(\Gamma_{CH})$ = 2. If $$\Gamma_{ULLA_2} < \Gamma_{CH} \leq \Gamma_{ULLA_3},$$ mobile is allowed to use CS-1, CS-2, CS-3, and ULPCA set MCS_CS to 3, i.e., MAX_CS = $f(\Gamma_{CH})$ = 3. If $\Gamma_{CH} > \Gamma_{ULLA_3}$, mobile is allowed to use CS-1, CS-2, CS-3 and CS-4, and ULPCA set MAX_CS to 4, i.e., MAX_CS = $f(\Gamma_{CH})$ = 4. |
| $CS_{LA}$ | Unitless | Output of the link adaptation algorithm to be used by the power control algorithm. This equals the weakest coding scheme, which is going to be used over the air interface during the next measurement interval. |

TABLE 2

Tunable parameters used by the uplink power control algorithm.

| Algorithm tunable parameter | Units | Definition | Range |
|---|---|---|---|
| $\alpha$ | Unitless | Parameter used by the mobile station to compute uplink transmit power based on receive level. | 0, 0.1, . . . , 1.0 |
| PMAX | dBm | Maximum allowable mobile transmit power in the cell. | 7, 9, 11, . . . , 39 |
| $\Gamma_{CH}^D$ | dB | Default value of $\Gamma_{CH}$ sent to mobile in UL TBF assignment message in the absence of caching, or in the case of caching when mobile history is unreliable; $\Gamma_{CH}^D \geq 0$ | 0, 2, . . . , 30 |
| $\Gamma_{CH}^{max}$ | dB | Maximum allowable value of $\Gamma_{CH}$; $\Gamma_{CH}^{max} \geq 0$. If $\alpha > 0$, then $\Gamma_{CH}^{max}$ should be set equal to 62. | 0, 2, . . . , 62 |
| $\Gamma_{ULLA_1}$ | dB | If $\Gamma_{CH} \leq \Gamma_{ULLA_1}$, mobile is only allowed to use CS-1, and ULPCA set MAX_CS to 1. | 4, 6 |
| $\Gamma_{ULLA_2}$ | dB | If $\Gamma_{ULLA_1} < \Gamma_{CH} \leq \Gamma_{ULLA_2}$, mobile is only allowed to use CS-1 and CS-2, and ULPCA set MAX_CS to 2. | 4, 6, 8 |
| $\Gamma_{ULLA_3}$ | dB | If $\Gamma_{ULLA_2} < \Gamma_{CH} \leq \Gamma_{ULLA_3}$, mobile is allowed to use CS-1, CS-2 and CS-3, and ULPCA set MCS_CS to 3. If $\Gamma_{CH} > \Gamma_{ULLA_3}$, mobile is allowed to use CS-1, CS-2, CS-3 and CS-4, and ULPCA set MAX_CS to 4. | 6, 8, 10 |
| $b_j$ | Number of bit errors | Target number of bit errors per RLC block for mobile station m when using CS-j. It is the same for all mobiles and when only CS-1 and CS-2 deployed. When we deploy CS-3, this value will depend on factors such as how far away the mobile is from base station, current interference levels, path-loss, and shadow fading. | 0, 1, . . . 31 |

TABLE 2-continued

Tunable parameters used by the uplink power control algorithm.

| Algorithm tunable parameter | Units | Definition | Range |
|---|---|---|---|
| $\mu$ | log(BER)/ (C/I in dB) | -(Slope of the log(BER) versus C/I (dB) plot). ($\mu>0$) | 0.05, 0.1, 0.15, . . . , 1.0 |
| $B_j$ | Block error rate | Target block error rate when using CS-j. | 0, 0.001, 0.002, 0.003, . . . , 0.01 |
| $\beta_j$ | BLER/ (C/I in dB) | -(Slope of BLER versus C/I (dB) plot). ($B_j>0$) | 0.005, 0.01, 0.015, . . . , 0.1 |
| $BLER_{low}$ | Block error rate | If BLER $\geq BLER_{low}$, then C/I is high, and BER measurements are reliable | 0.1, 0.2, . . . , 0.4 |
| $BLER_{high}$ | Block error rate | If BLER $\geq BLER_{high}$, then C/I is too low, and BER measurements are unreliable. ($BLER_{low} \leq BLER_{high}$) | 0.1, 0.2, ..., 0.4 |
| Quick_ACK_flag | Unitless | Indicates whether the Quick ACK feature is ON or OFF. Setting it to 1 enables the feature, while setting it to 0 disables it. | 0, 1 |
| $N_{QA}$ | Unitless | The rPCU schedules an UL ACK/NACK after receiving the first $N_{QA}$ RLC blocks from the mobile. This is part of the Quick ACK procedure. Based on the total number of block errors, the ULPCA determines whether it is necessary to send the Quick ACK. | 5, 6, . . . , 10 |
| $K_{QA}$ | Unitless | If total number of block errors is greater than or equal to $K_{QA}$, then the ULPCA determines that a Quick ACK should be sent. ($K_{QA} \leq N_{QA}$) | 1,2,3, . . . , 10 |
| $N_{min}$ | Unitless | Minimum number of RLC blocks which must be received on a time slot during a measurement interval before $\Gamma_{CH}(s)$ can be updated again using the BER and BLER-based power step estimation techniques. | 5, 6, . . . , 10 |
| $\theta$ | Unitless | Gain used to dampen increases in additional uplink attenuation made in response to channel quality measurements. ($0 \leq 1$) | 0.25, 0.3, . . . , 1.0 |
| $T_a$ | Number of frames | Rate at which $\Gamma_{CH}(s)$ is decreased if the measurement interval is too long (aging factor). ($T_a > 0$) | 100, 150, . . . , 1000 |
| T | Number of frames | If $FN_c-FN_o(s)>T$, and $N(s) < N_{min}$, then force an update of $\Gamma_{CH}(s)$. (T > 0) | 100, 150, . . . , 1000 |
| $T_D$ | Number of frames | Downlink reception delay bound. The amount of time it takes an uplink ACK/NACK message to be received and processed by the mobile station measured from the time the power control parameters are inserted in the ACK/NACK message. ($T_D > 0$) | 5, 10, 15, . . . , 1000 |
| $T_{cache}$ | Number of frames | Rate at which cached values of $\Gamma_{CH}^m$ are aged over time. (The caching feature can be turned OFF by setting $T_{cache} = 0$. Conversely, the caching feature is ON if $T_{cache} > 0$. | 0, 100, 150, 200, . . . , 1000 |
| Interferene_Margin | dB | Interference Margin for non-frequency hopped TRX or cell. For non-frequency hopped TRXs or cells, if the TBF is established on a TRX different from the one to which it was established earlier, then it may be necessary to assign an initial power which is Interference_Margin dB higher. This margin accounts for potential quality or interference differences between TRXs. See Section 0 for additional details. (Interference_Margin $\geq 0$) | 0,2, . . . , 10 |
| Interference_Margin_FH | dB | Interference Margin for frequency hopped TRX or cell. For frequency hopped TRXs or cells, if the TBF is established with an FHS id different from the one with which it was established earlier, then it will be assigned an initial power Interference_Margin_FH dB higher. This margin accounts for potential quality differences between FHS ids. (Interference_Margin_FH $\geq 0$) | 0, 2, . . . , 10 |

The uplink power control algorithm relies on being able to estimate $\Delta(s)$, the amount a mobile station should reduce its transmit power, from the observed BLER and BER. Accordingly, BER-based and BLER-based power control is now discussed.

BER-Based Power Control

Consider a mobile m with an uplink TBF on time slot s. Suppose that x*dB is the desired target C/I for the mobile. Let $P_{CH}(s)$ dBm be the mobile's transmit power, and $x^*+\Delta(s)$ dB be the corresponding C/I at the BTS. Thus, $\Delta(s)$ represents the excess power being used by the mobile. If $\Delta(s)<0$, then $P_{CH}(s)$ is too low.

The term $\Delta(s)$ is referred to as the power control step. The algorithm according to the invention is interested in estimating the value of $\Delta(s)$ from the observed bit errors. Because of downlink reception delay and power ramping (to be further discussed below, not all of the blocks received during the measurement interval were transmitted at power $P_{CH}(s)$ dBm. Precisely, suppose that the $i^{th}$ RLC block, which was correctly received on time slot s, was transmitted at power $P_{CH}(s)+\Delta_i(s)$ dBm. Assuming that the interference level and shadow fade remain constant throughout the measurement interval, the corresponding observed C/I equals $x^*+\Delta(s)+\Delta_i(s)$ dB. It now follows from expression (2) that $$\hat{b}(s) \approx \text{Expected number of bit errors} \qquad (6)$$

$$= \sum_{i=1}^{n_{sum}(s)} \sum_{j=1}^{4} 1(CS_i = j) c_j e^{-\mu(x^* + \Delta(s) + \Delta_i(s))},$$

where $CS_i$ is the coding scheme used to encode the $i^{th}$ correctly received RLC block, and $1(\cdot)$ is the indicator function, which is defined as $$1(CS_i = y) = \begin{cases} 1, & \text{if } CS_i = y, \\ 0, & \text{otherwise.} \end{cases} \qquad (7)$$

Combining expressions (3) and (6) provides the following expression (8):

$$\Delta(s) = \frac{1}{\mu} \log\left( \frac{\sum_{i=1}^{n_{sum}(s)} \sum_{j=1}^{4} 1(CS_i = j) b_j e^{-\mu \Delta_i(s)}}{\hat{b}(s)} \right) \qquad (8)$$

If all the RLC blocks were transmitted at the same power level, i.e., $\Delta_i(s)=0$, then, (8) simplifies as $$\Delta(s) = \frac{1}{\mu} \log\left( \frac{n_1(s)b_1 + n_2(s)b_2 + n_3(s)b_3 + n_4(s)b_4}{\hat{b}(s)} \right). \qquad (9)$$

The value of $\Delta(s)$ obtained from the BER-based algorithm is denoted $\Delta_{BER}(s)$.

BLER-Based Power Control

The same notations are used above, with the following modification. The algorithm is interested in the transmit power for RLC blocks which were received in error; let the $i^{th}$ RLC block on time slot s be transmitted at $\Gamma_{CH}(s)+\Delta_i(s)$ dBm, and the corresponding C/I be $x^*+\Delta(s)+\Delta_i(s)$ dB. Now, using expression (4), the following expression (10) is provided:

$$k_{sum}(s) \approx \text{Expected number of block errors} \qquad (10)$$

$$= \sum_{i=1}^{N_{sum}(s)} \sum_{j=1}^{4} 1(CS_i = j)[d_j - \beta_j(x^* + \Delta(s) + \Delta_i(s))],$$

and, it follows from expression (5) that $$\Delta(s) = \frac{-k_{sum}(s) + \sum_{i=1}^{N_{sum}(s)} \sum_{j=1}^{4} 1(CS_i = j)[B_j - \beta_j \Delta_i(s)]}{\sum_{i=1}^{N_{sum}(s)} \sum_{j=1}^{4} 1(CS_i = j) \beta_j} \qquad (11)$$

As in the case of the BER-based algorithm, if it is assumed that all the RLC blocks were transmitted using the same power level, then expression (11) affords the following simplification:

$$\Delta(s) = \frac{-k_{sum}(s) + (N_1(s)B_1 + N_2(s)B_2 + N_3(s)B_3 + N_4(s)B_4)}{N_1(s)\beta_1 + N_2(s)\beta_2 + N_3(s)\beta_3 + N_4(s)\beta_4}. \qquad (12)$$

The value of $\Delta(s)$ obtained from the BLER-based algorithm is denoted $\Delta_{BLER}(s)$.

Figure 9:
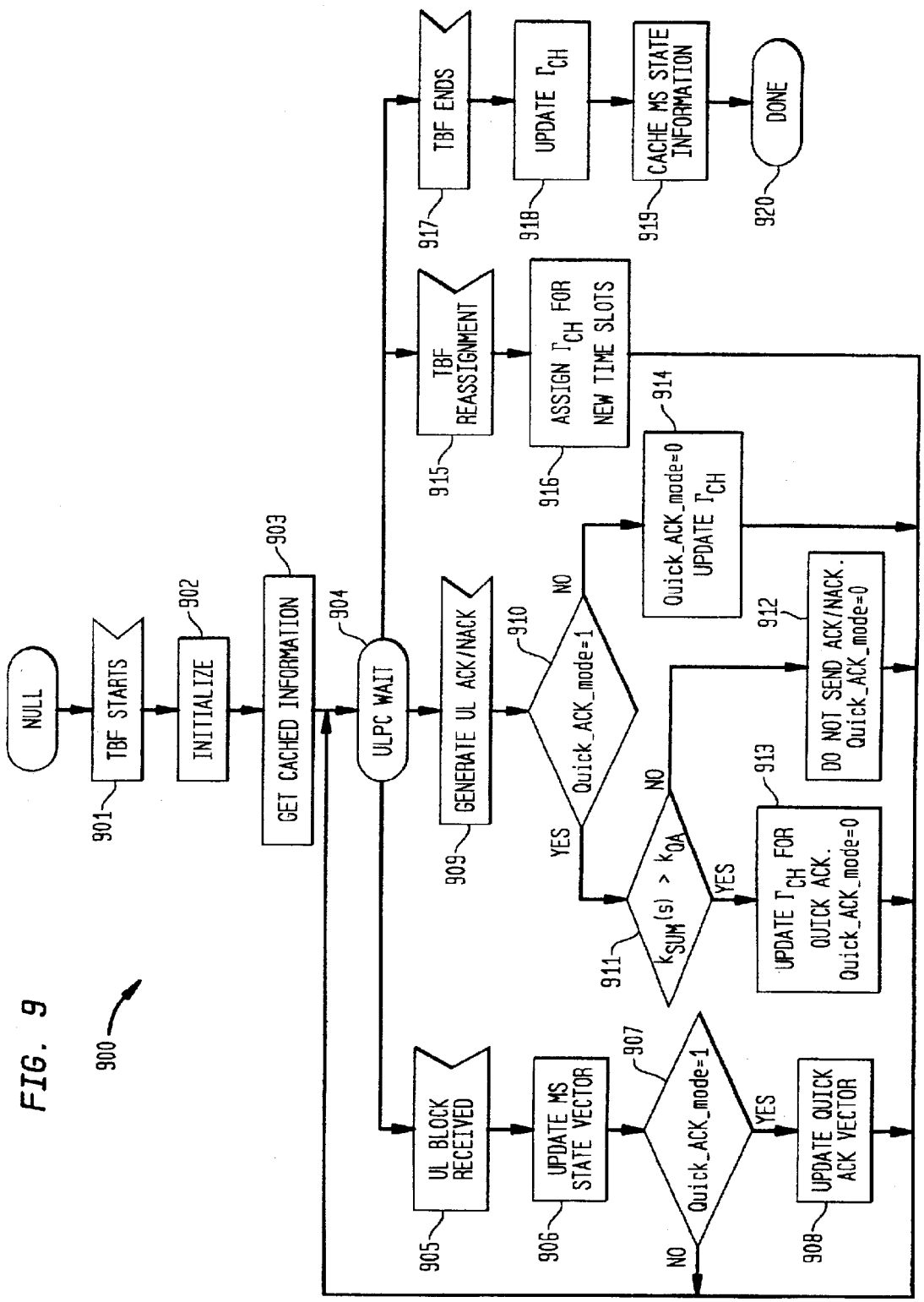
FIG. 9 is a flow chart illustrating the uplink power control finite state machine and method in accordance with the invention.

FIG. 9 illustrates an overview of the uplink power control method, embodied and shown as a finite state machine. One finite state machine is associated with each mobile station with an active uplink TBF. For reasons of efficiency, the algorithm is driven solely by external events: start of a TBF, receipt of an uplink block, transmission of a packet uplink ACK/NACK message, transmission TBF reassignment message, or termination of a TBF. No timers are employed.

The Quick Ack feature, as more fully described below, is implemented in an effort to improve the transient performance of the power control algorithm. For example, in situation where initial transmit power $P_o$ is much less than target mobile transmit power $P_T$, then block errors are very likely. Accordingly, the received quality of individual RLC blocks is assessed by the rPCU in the BTS, and if the quality is very poor within a first polling interval, the BTS sends a Quick ACK UL ACK/NACK message with a new value of $\Gamma_{CH}$, a message commanding a higher target mobile transmit power $P_T$ from the mobile station.

Accordingly, the algorithm employs one flag to control use of the Quick Ack feature. When set to "1", indicates that the Quick ACK feature is active. During this period, the uplink power control algorithm (ULPCA) closely monitors the quality of the first several uplink blocks sent on the TBF to determine if the initial uplink transmit power level commanded by the rPCU at the start of the TBF is too low. When set to "0", the flag indicates that the Quick ACK feature has been disabled by the power control algorithm.

Hereinafter, the procedures Initialize, Get cached information, Update MS state vector, Update Quick ACK vector, Update $\Gamma_{CH}$ for Quick ACK, Update $\Gamma_{CH}$, Assign $\Gamma_{CH}$ for new time slots and Cache $\Gamma_{CH}$ are initially described in general with reference to FIG. 9, are then discussed in further detail with reference to FIGS. 10–20.

Referring to FIG. 9, there is illustrated a flowchart outlining the method 900 in accordance with the present invention. Additionally in FIG. 9, there is provided a key with explanations of the variables used for ease of reference. The implementation of the algorithm is as follows. At step 901, an uplink TBF begins for a mobile. At step 902, counters and other variables used by the uplink power control algorithm for this TBF are initialized. These are illustrated in the following Table 3.

TABLE 3

Initialization of variables at the start of an uplink TBF

For each time slot s, set $N_j(s) = 0, j = 1, 2, 3, 4$
$n_j(s) = 0, j = 1, 2, 3, 4$
$k_j(s) = 0, j = 1, 2, 3, 4$
$N_{sum}(s) = k_{sum}(s) = 0$
$\hat{b}(s) = 0$
$N_{tot} = k_{tot} = 0$
$\Delta\Gamma(s) = 0$
$FN_o(s) = FN_{new}(s) = FN_c$
Quick_ACK_mode = 1
$CS_{LA} = 2$
MAX_CS = 2

At step 903, and if the algorithm's caching feature is implemented, the algorithm checks whether there was a recent uplink TBF for this mobile in this cell. If caching is enabled, the initial assignment of $\Gamma_{CH}$ values on each timeslot is based on the values of $\Gamma_{CH}$ used for the mobile's previous uplink TBF, the TRX on which the TBF is established, and the amount of time that has elapsed since the previous TBF. If caching is not implemented, the TBF is assigned a default value of $\Gamma_{CH}$ on each timeslot. This default value is engineered so that the majority of mobile stations in the cell starting an uplink TBF will experience acceptable uplink channel quality.

At step 904, the uplink power control algorithm waits for an event to occur. Next, an uplink block that was allocated to the mobile is received from the BTS, at step 905. Thereafter, counters used to track the performance of uplink channel are updated at step 906 in response to parameters in the PCU frame header of the received block. This update step keeps a tally of the number of errored blocks since the start of a measurement interval, the observed bit error rate, and other counters used to assess the quality of the link.

The Quick ACK feature is disabled, if the Quick_Ack_mode=0 (step 907). The feature is disabled after the Quick ACK UL ACK/NACK message is scheduled to be sent to the mobile since the start of the TBF. If the Quick_Ack_mode=1, the Quick ACK feature remains active (and counters and other parameters used by the Quick ACK algorithm are updated (step 908) based on the fields contained in the received block's PCU frame header.

Referring back to the wait period at step 904, an uplink ACK/NACK is also generated by the rPCU at step 909. Here the power control algorithm determines the values of $\Gamma_{CH}$ that need to be included in the message. Since the power levels determined by the power control algorithm are time-sensitive, they should be calculated at the last possible instant before the block leaves the rPCU. The rPCU is scheduling this ACK/NACK message as a Quick ACK in step 910. The ULPCA finally determines whether it is necessary to send the Quick ACK or not by determining whether the total number of block errors $k_{SUM}(s)$ is greater than or equal to tunable parameter $k_{QA}$ (step 911) If not, the ULPCA determines that the channel conditions are acceptable, and it is not necessary to send a Quick ACK. Quick_ACK_mode is set to 0 (step 912), thereby disabling the Quick ACK feature.

Back at step 911, if at the beginning of an UL TBF, and the ULPCA has determined that the uplink power used by the MS is too low, a Quick ACK should be sent to the mobile. Since not enough blocks have been received in order to base the power control update using the accurate "update $\Gamma_{CH}$" procedure, the values of $\Gamma_{CH}$ will instead be updated (step 913) based on a crude "Update $\Gamma_{CH}$ for Quick ACK" procedure. Values of $\Gamma_{CH}$ to be included in the ACK/NACK message are determined using the "Update $\Gamma_{CH}$ for Quick ACK" procedure. Quick_ACK_mode is set to 0.

Back at step 910, if it is determined that Quick_Ack_mode=0, the ACK/NACK is not a Quick ACK. The Quick_ACK_mode flag is set to 0, disabling the Quick-ACK feature. The values of $\Gamma_{CH}$ to include in the ACK/NACK message are calculated using the "update $\Gamma_{CH}$" procedure (step 914) described in more detail hereafter.

At step 915, the set of timeslots allocated to the mobile station changes. Values of $\Gamma_{CH}$ need to be determined for the new timeslots, and counters used to track the quality of the new timeslots need to be initialized. Values of $\Gamma_{CH}$ for the new timeslots are determined (step 916) and included in the assignment message. Counters used to track the quality of the new timeslots are initialized. At step 917, the uplink TBF for the mobile ends. The values of $\Gamma_{CH}$ on each timeslot are updated (step 918) based on the quality of the uplink packets received since the start of the measurement interval. Thereafter, the current frame number and transmit power level are cached at step 919 if the caching feature is implemented, and the algorithm terminates (step 920).

Get Cached Information Procedure (Step 903)

In the case when the mobile does not have any cached information, or when the caching feature is turned OFF, the initial value of $\Gamma_{CH}(s)$ is set to $\Gamma_{CH}^D$. If, however, some cached information is indeed available, then the initial value of $\Gamma_{CH}(s)$ is set to the cached value of $\Gamma_{CH}(s)$ aged by an amount proportional to the elapsed time between the previous TBF and the current one. If necessary, an interference margin may be introduced, which accounts for any anticipated difference between the channel quality for the previous TBF and the current one. First, it is necessary to analyze, in detail, the case when no interference margin is necessary. Here, when an UL TBF is re-established for mobile m, the value of $\Gamma_{CH}^{INIT}(s)$ is selected from the cached information as follows: for each timeslot on which the TBF is established, set $$\Gamma_{CH}^{INIT}(s) = \qquad (13)$$

$$\begin{cases} \max\left(\Gamma_{CH}^D, \left[\Gamma_{cache}^m - 2\frac{FN_c - FN_{cache}^m}{T_{cache}}\right]^+\right), & \text{if } \Gamma_{cache}^m(s) \geq \Gamma_{CH}^D \\ \Gamma_{cache}^m, & \text{otherwise.} \end{cases}$$

The expression can be explained as follows. If $\Gamma_{cach}^m(s) \geq \Gamma_{CH}^D$, then the mobile is experiencing good channel conditions. However, this may change with time. So, the cached information is aged. The term $$2\frac{FN_c - FN_{cache}^m}{T_{cache}}$$

serves as the aging factor; the numerator represents the time elapsed since the last UL TBF for the mobile was torn down, while the denominator equals the amount of elapsed time which would trigger a 2 dB increase in power. For example, if $T_{cache}=100$, then $$\Gamma_{CH}^{INIT}(s) = \begin{cases} \Gamma_{cache}^m, & \text{if } FN_c - FN_{cache}^m < 50, \\ \Gamma_{cache}^m - 2, & \text{if } 75 \leq FN_c - FN_{cache}^m < 150, \\ \Gamma_{cache}^m - 4, & \text{if } 175 \leq FN_c - FN_{cache}^m < 250, \text{ etc.} \end{cases}$$

If on the other hand, $r_{cache}^m(s) < \Gamma_{CH}^D$, then the mobile is experiencing harsh channel conditions. Accordingly, set $\Gamma_{CH}^{INIT}(s) = \Gamma_{cache}^m$. The information is not aged here, because $\Gamma_{CH}^D$ is chosen such that $\Gamma_{CH}^{INIT}(s) < \Gamma_{CH}^D$ with very low probability. So, in this case, with very high probability, the mobile is going to experience better channel conditions after some time. Therefore, setting $\Gamma_{CH}^{INIT}(s) = \Gamma_{cache}^m$ will ensure good airlink performance for the UL TBF with very high probability.

Next, situations are examined where introducing an additional interference margin into the picture is necessary. Aging of $\Gamma_{cache}^m$ sufficiently captures any channel quality variations only if either of the following two conditions are satisfied:

(1) The previous TBF was frequency hopping, and so is the current one, and, in addition, the previous TBF had the same FHS id as the current one. For two concurrent TBFs with the same FHS ids, the average interference level observed by the base station is approximately the same. So, under the condition above, the difference in the channel quality of the previous TBF and that of the current one is largely due to variations in shadow fading, and, in part, due to change in the number of interferers in the neighbor cells. Since, this variation can be accounted for entirely by aging $\Gamma_{cache}^m$, we do not need to introduce an additional interference margin when calculating $\Gamma_{CH}^{INIT}(s)$; and (2) If the previous TBF was non-frequency hopping, and so is the current one, and, in addition, the previous TBF was established on the same TRX as the current one. This is the counterpart of condition (1) above for the non-frequency hopped case. Specifically, the interference levels seen by the base station for two concurrent TBFs on the same TRX is approximately the same.

The explanations above suggest interference margin needs to be introduced where:

(a) The FHS ids of the previous TBF and the current one are different. Clearly this is applicable only to the case of frequency hopping. In this case, a margin equal to Interference_Margin_FH is introduced.

(b) The TRX on which the previous TBF was established is different from that of the current one. This applies only to the case of no-frequency hopping. In this case, a margin equal to Interference_Margin is introduced.

(c) The previous TBF was frequency hopping but the current TBF is not. In this case, $\Gamma_{cache}^m$ is used by the ULPCA to estimate the path loss and shadow fade that the current TBF is experiencing. The interference levels, however, are likely to be very different, and so a margin equal to Interference_Margin is introduced.

(d) The previous TBF was not frequency hopping, but the current one is. This is similar to condition (c) above; a margin equal to Interference_Margin_FH is introduced.

Figure 10A:
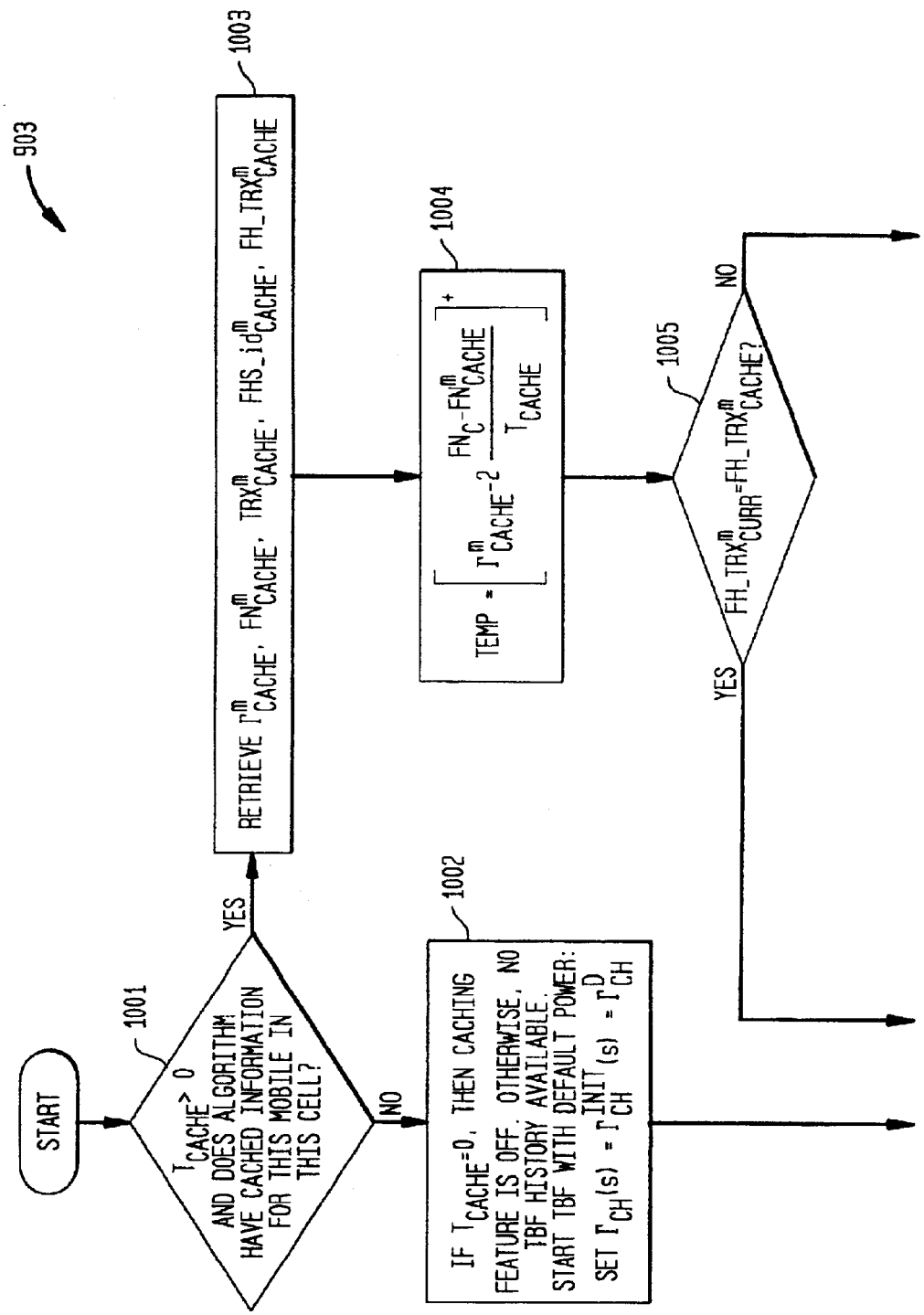
FIG. 10 is a flow chart illustrating how initial mobile transmit power is determined.
Figure 10B:
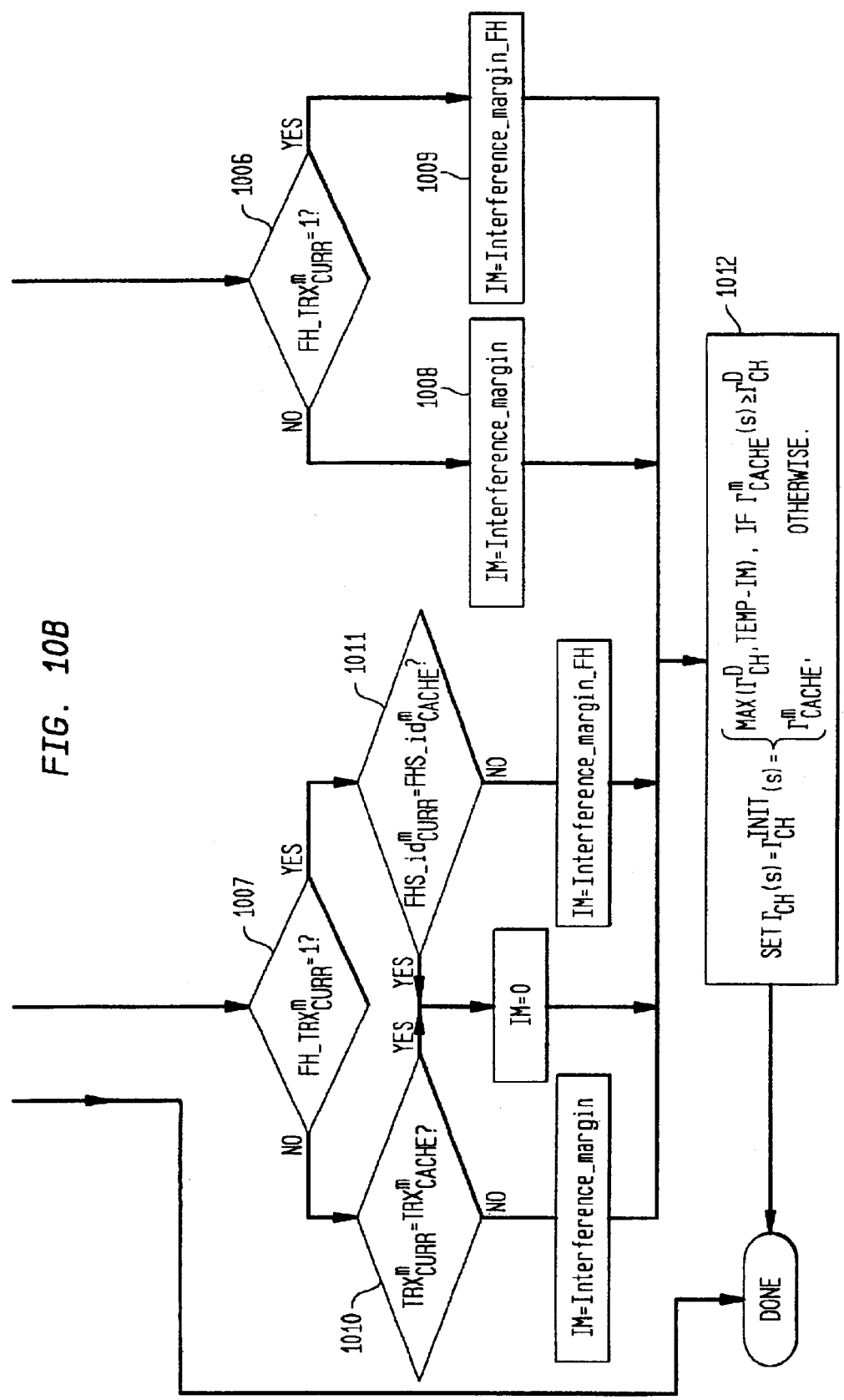

FIG. 10 is a flow chart illustrating how initial mobile transmit power is determined. Specifically, FIG. 10 illustrates a flowchart for the "Get cached information" procedure 903 of FIG. 9. Initially, at step 1001, since no TBF history is initially available or the caching feature is OFF for this mobile in this cell, the mobile station is commanded to use a default transmission power level at step 1002, which is determined by the tunable parameter $\Gamma_{CH}^b$. If, however, in the recent past, this mobile station has had an uplink TBF in this cell, the algorithm retrieves the cached power level (step 1003) as well as the time (frame number) at which the previous TBF ended, an indication of whether the previous TBF was frequency hopping or not ($FH\_TRX_{cache}^m$), the TRX on which the previous TBF was active ($TRX_{cache}^m$), and the FHS id for the mobile ($FHS\_id_{cache}^m$). Note that $TRX_{cache}^m$ is meaningful only if the previous TBF was non-frequency hopping, while $FHS\_id_{cache}^m$ is meaningful only if the previous TBF was frequency hopping.

At step 1004, TEMP is set to $$\text{TEMP} = \left[\Gamma_{cache}^m - 2FN_c - \frac{FN_{cache}^m}{T_{cache}}\right]^+.$$

This is done for the sake of convenience. Next, it is checked whether the current TBF that is frequency hopping for the mobile station and the previous TBF that was frequency hopping are equal at step 1005. Specifically both the previous and current TBFs are evaluated, at step 1006 and 1007. If the result at step 1006 is NO, the previous TBF was not frequency hopping, but the current one is. So, IM=Interference_Margin_FH, is set (step 1008), i.e., set the margin to be Interference_Margin_FH. If the result at step 1006 is YES, the previous TBF was frequency hopping, but the current one is not. Thus, the margin is set to be Interference_Margin.

Similarly, if the result of step 1007 is NO, the previous TBF was not frequency hopping and neither is the current one. Thus, it is evaluated whether the TBFs are on the same carrier (step 1010). If the TRXs are the same, i.e., if $TRX_{CH}^m = TRX_{cache}^m$ then IM=0, i.e., no margin is necessary; else, set IM=Interference Margin. Further, if the result at step 1007 is YES, the previous TBF was frequency hopping and so is the current one. Thus, the FHS ids are checked (step 1011) to see if they are the same, i.e., if $FHS\_id_{CH}^m = FHS\_id_{cache}^m$. If they are the same, then IM=0, no margin is necessary; else, set IM=Interference_Margin_FH. Finally, at step 1012, the interference margin is introduced, and $\Gamma_{CH}^{INIT}(s)$ is calculated.

Cache MS State Information Procedure (Step 919)

Figure 11:
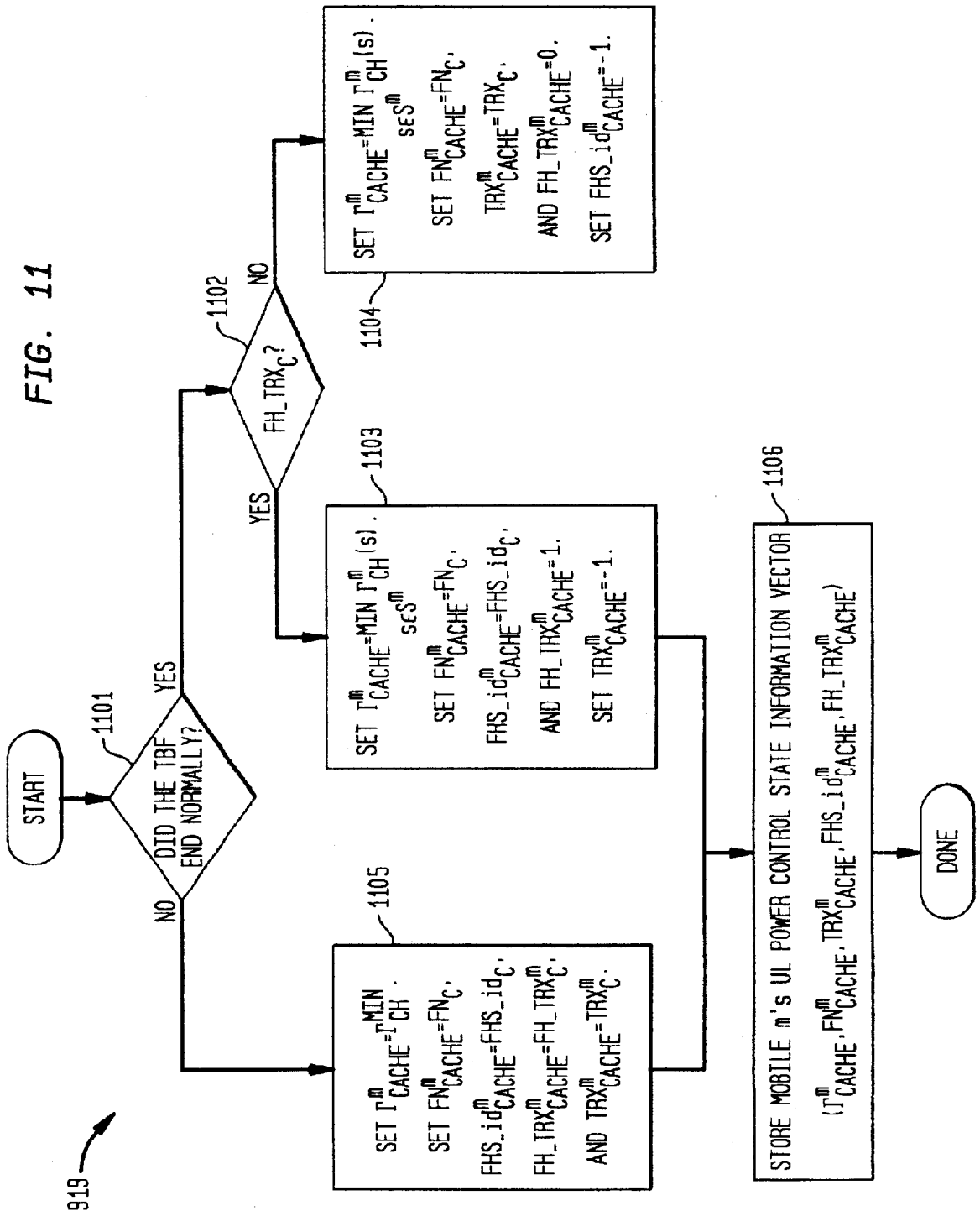
FIG. 11 depicts a flow chart to illustrate caching information on the power levels used for a mobile's uplink TBF when the TBF ends.

FIG. 11 depicts a flow chart to illustrate the cache MS state information procedure 919 for caching information on the power levels used for a mobile's uplink TBF when the TBF ends. As discussed above, caching provides a simple and effective tool for improving the performance of the uplink power control algorithm for short-lived UL TBFs. At the end of each UL TBF, the algorithm stores some key power control state information for each mobile m. This information can be used to select $\Gamma_{CH}^{INIT}(s)$ more accurately at the start of the next UL TBF for the mobile.

As seen in FIG. 11, it is first determined whether the TBF ended normally in step 1101. If so, then it is next determined (step 1102) whether the current TBF is frequency hopping. If so, then in a step 1103, the algorithm determines the smallest value of $\Gamma_{CH}$ (equivalently, the highest uplink transmit power used) over all uplink timeslots "s" assigned to the mobile. Since the TBF ended normally, this transmit power level gives an excellent indication of the power level a mobile should use if another uplink TBF for this mobile begins in the near future. Since the current TBF is frequency hopping, set $FH\_TRX_{cache}^m = 1$, and cache the FHS id. The TRX on which the TBF exists is irrelevant; thus $TRX_{cache}^m$ is set to −1 to indicate this condition. This step also conserves the time at which these estimates were made ($FN_{cache}^m$)

If the current TBF is not frequency hopping, the algorithm at step 1104 determines the smallest value of $\Gamma_{CH}$ (equivalently, the highest uplink transmit power used) over all uplink timeslots s assigned to the mobile. As the TBF ended normally, this transmit power level gives an excellent indication of the power level a mobile should use if another uplink TBF for this mobile begins in the near future. Since the current TBF is not frequency hopping, set $FH\_TRX_{\text{cache}m}=0$, and cache the TRX on which the TBF exists. The FHS id is non-existent; thus $FHS\_id_{\text{cache}m}$ is set to −1 to indicate this condition.

If the TBF did not end normally, the procedure moves to step 1105. Since the TBF ended abnormally, it is very likely that the uplink transmit power used by the mobile was too low. The algorithm disregards the current values of $\Gamma_{CH}$ assigned to the mobile. Should another uplink TBF for mobile m begin in the near future, the mobile should use the default maximum transmit power (the transmit power corresponding to $\Gamma_{CH}^{min}$). Finally, outputs from either of steps 1103 or 1105. the mobile's state vector, is cached at a step 1106.

Update MS State Vector Procedure (Step 906)

When an uplink ACK/NACK message is sent to the mobile, two factors influence the amount of time taken by the mobile to adjust to the new uplink transmit power: "power ramping" and "downlink reception delay."

Power ramping: Upon receiving a new value of $\Gamma_{CH}(s)$, the mobile station adjusts its transmit power at the rate of 2 dB every 60 ms. For example, suppose the mobile's transmit power is 25 dBm at the time the UL ACK/NACK message is received commanding the mobile to increase the power to 29 dBm. The mobile does so in two steps: 60 ms after receiving the UL ACK/NACK message, it increases the power to 27 dBm, and 120 ms later to 29 dBm. This example indicates that during any measurement interval, some of the uplink RLC blocks may be transmitted at a power level that is different from that of the other blocks. Preliminary results from the inventors' uplink power control simulation model show that the algorithm performs very well even if these differences in transmit power levels between different RLC blocks in a measurement interval are unaccounted for. This allows use of the simpler expressions (9) and (12), instead of (8) and (11).

Figure 12:
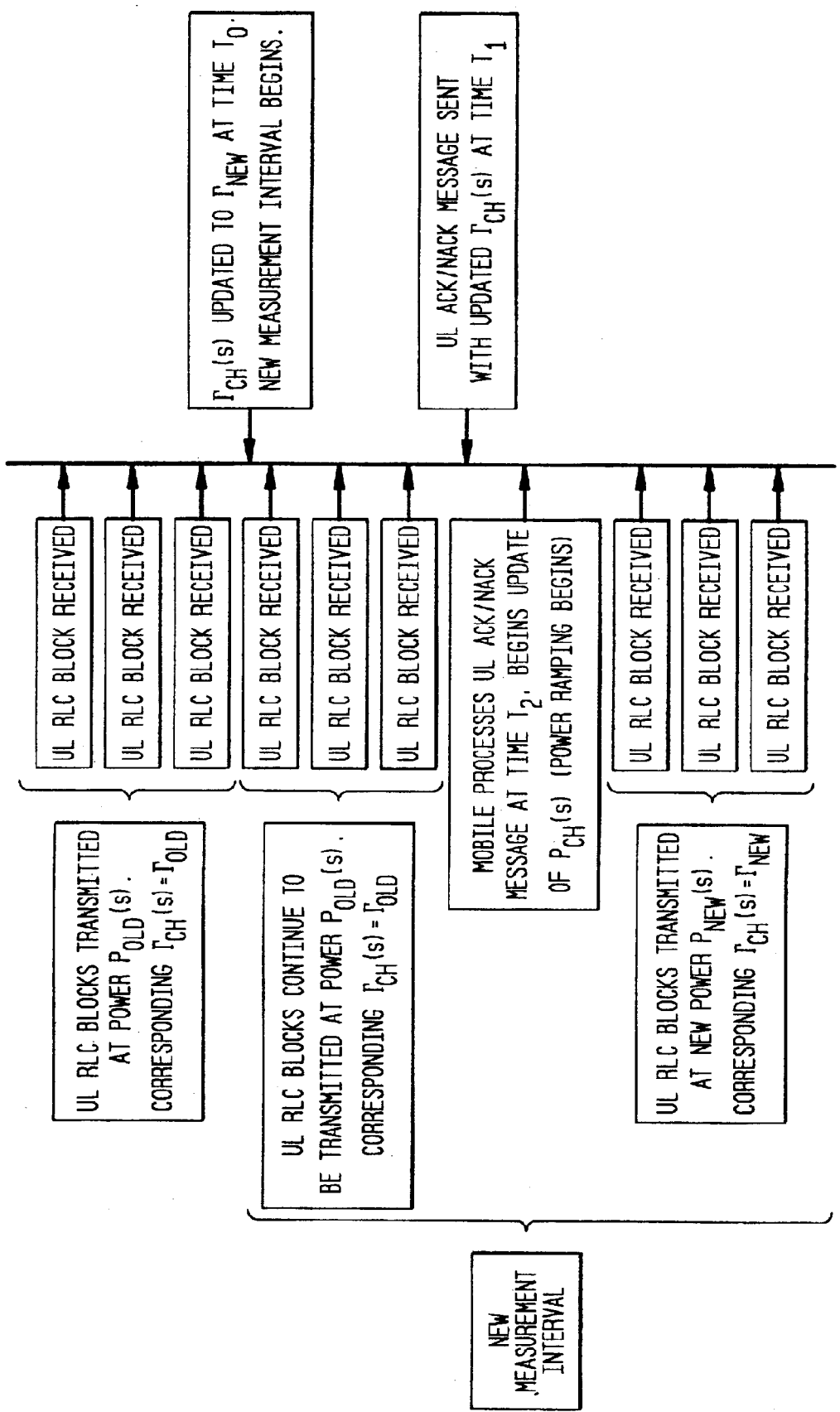
FIG. 12 illustrates the effect of downlink transmission delay on system performance.

Downlink reception delay: FIG. 12 illustrates the effect of downlink transmission delay on system performance. As seen in FIG. 12, even though the algorithm updates $\Gamma_{CH}(s)$ to $\Gamma_{new}$ at time $T_0$, the uplink ACK/NACK message containing the updated value is received by the mobile only at time $T_1$. The mobile takes yet another $T_2-T_1$ seconds before it begins transmitting uplink blocks using a transmit power corresponding to the updated value of $\Gamma_{CH}(s)$.

Meanwhile all UL RLC blocks received in the interval $(T_0, T_2)$ were transmitted at $P_{old}(s)$ dBm. This is called downlink reception delay. It can be shown that the uplink power control algorithm may become unstable if this delay is unaccounted for in the updates of $\Gamma_{CH}(s)$.

Another issue is determining the minimum number of blocks that must be received before an update of $\Gamma_{CH}(s)$ can be made. Except in some cases, an update is done only if the number of blocks received on timeslot s during the measurement interval N(s) is at or above a tunable threshold $N_{min}$. Note that if $N_{min}$ is too large, then the uplink power control algorithm becomes too slow to react to changes in channel conditions. On the other hand, if $N_{min}$ is too small, then the estimates of Δ(s) obtained from the BER and BLER based algorithms are unreliable.

Since the mobile shares the time slot with various other uplink TBFs, the time taken before $N_{min}$ uplink blocks are received on a time slot can still be very long. This causes the uplink power control algorithm to react very slowly to rapidly changing interference or shadow fade. This is undesirable especially in eases where the C/I drops to unacceptably low levels over the duration of a measurement interval. This occurs, for example when the mobile is entering a deep fade or when the interference level increases dramatically over the duration of the measurement interval. Such cases can be handled by periodically increasing the mobile transmit power.

Further, these factors can be accounted for by starting each measurement interval appropriately. The variable $FN_{new}(s)$ which denotes the beginning of a measurement interval for mobile m on time slot s, is set after each update of $\Gamma_{CH}(s)$.

Figure 13:
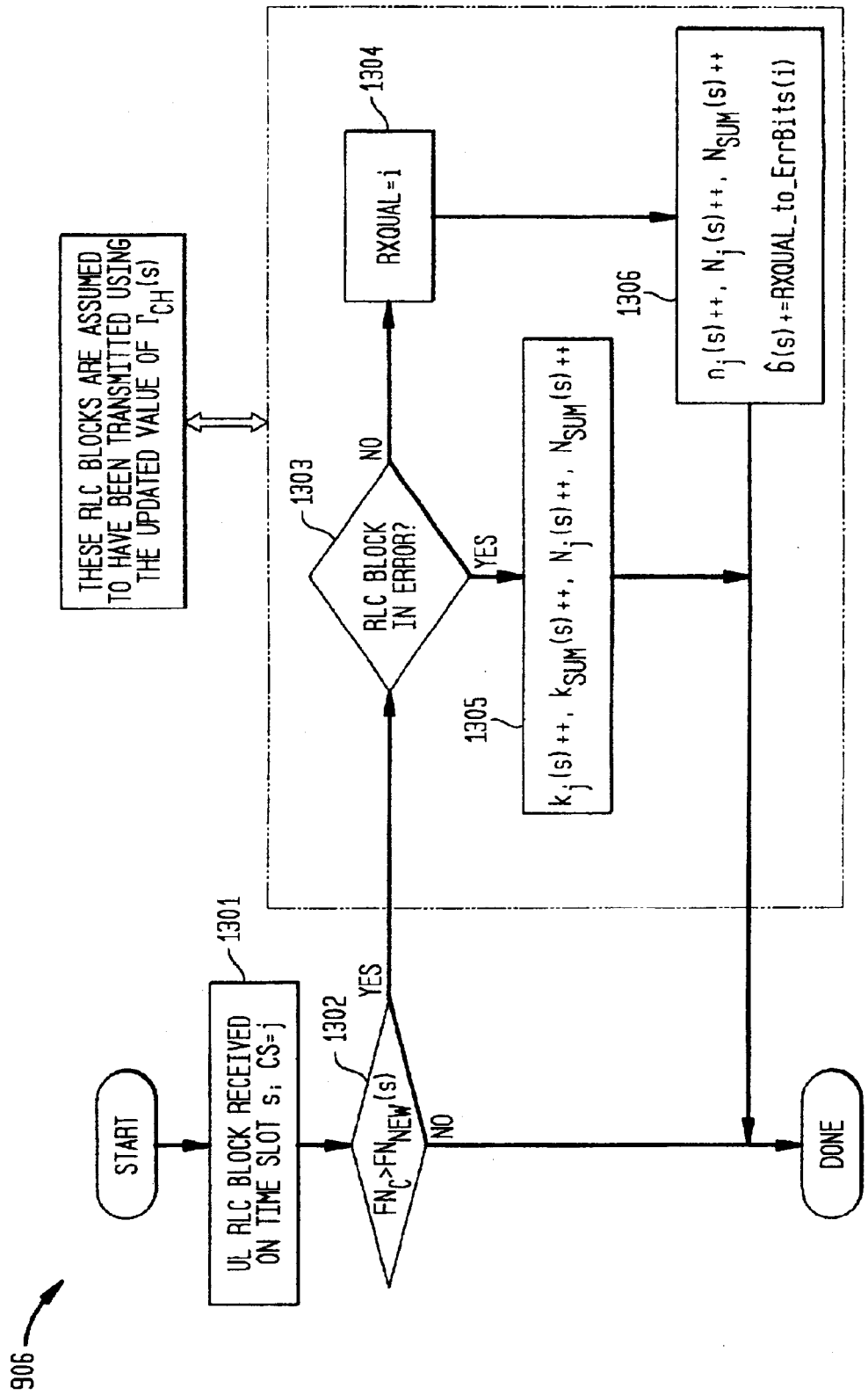
FIG. 13 is a flow chart illustrating how a mobile station state vector is updated during the measurement interval each time the base station receives an uplink block in accordance with the invention.

FIG. 13 is a flow chart illustrating how a mobile station state vector is updated during the measurement interval each time the base station receives an uplink block in accordance with the invention. FIG. 13 explains how the MS state vector in step 906 is updated during the measurement interval. At step 1301, the update procedure is called when the USF flag for this mobile has been set for the block which the BTS has sent to the rPCU. At step 1302, it is determined whether the received RLC block belongs to the new or previous measurement interval. If the current frame number is greater than the frame number for the new interval, at step 1303 the received RLC block is assumed to belong to the new measurement interval. Else, the received RLC block is assumed to belong the previous measurement interval.

At step 1304, since the block was not received in error, the RXQUAL value in the block's PCU frame reflects the number of bit errors in the received block and counters are incremented (step 1306). If there is error, the BFI of the received block indicates that the block is in error at step 1303. Counters are incremented (step 1305) which tally the number of errored blocks using this coding scheme from the start of the measurement interval on this timeslot ($k_j(s)$), the total number of errored blocks received on the timeslot ($k_{sum}(s)$), etc.

Procedures Relating to the "Quick ACK" Feature

The value of $\Gamma_{CH}^{INIT}(s)$ sent to the mobile in the assignment message plays a crucial role in determining the transient behavior of the uplink power control algorithm. Since it is expected that a significant fraction of all uplink TBFs will be short-lived (a few tens of RLC blocks), the transient behavior of the uplink power control algorithm, which determines the throughputs and delays experienced by these mobiles, is extremely important. Due to the limited amount of information available to the uplink power control algorithm when an uplink TBF is established, the value of $\Gamma_{CH}^{INIT}(s)$ may lead to poor receive quality in some cases.

For example, in the absence of caching, $\Gamma_{CH}^{INIT}(s)$ is set to $\Gamma_{CH}^D$. The value of $\Gamma_{CH}^D$ is a pre-engineered quantity, which depends on various factors like cell geometry, location of interfering cells, etc. It is easily seen that if $\Gamma_{CH}^D = \Gamma_0 - P_{MAX}$, then the mobile begins UL transmission at PMAX. In such a case, no savings in mobile transmit power are realized for short-lived UL TBFs, and high interference to neighbor cells is caused at any time an UL TBF is established. Therefore, it is desirable to set $\Gamma_{CH}^D$ to a value greater than $\Gamma_0 - P_{MAX}$, while ensuring acceptable RLC/MAC performance for most mobiles in the cell with high probability.

However, in some cases (for example, when a mobile is at the fringes of the cell), setting $\Gamma_{CH}^D > \Gamma_0 - P_{MAX}$ will yield a poor C/I upon establishing an UL TBF. It is necessary for the uplink power control algorithm detect such cases as quickly as possible, and reevaluate $\Gamma_{CH}(s)$ appropriately. This is achieved by using the "Quick ACK" algorithm illustrated in the flowchart below. We reiterate that the Quick ACK algorithm improves the transient behavior of the uplink power control algorithm and allows us to set $\Gamma_{CH}D>\Gamma_0-P_{MAX}$ thereby yielding higher power savings for short-lived uplink TBFs.

Update Quick ACK vector Procedure (Step 908)

Figure 14:
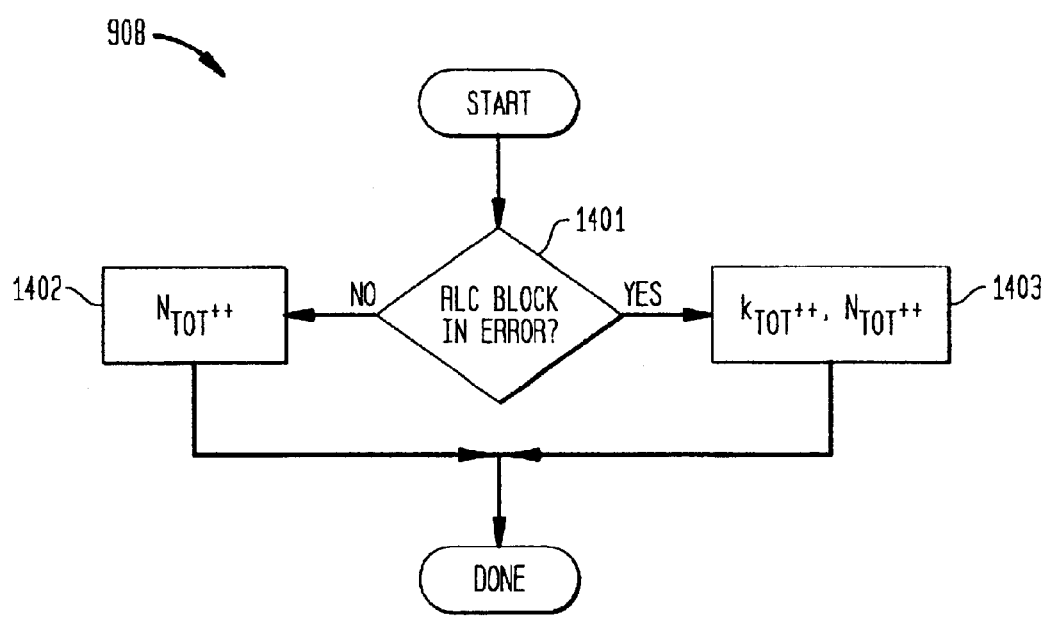
FIG. 14 illustrates the procedure for updating counters used by the Quick ACK feature of the present invention.

FIG. 14 illustrates the procedure for updating counters used by the Quick ACK feature of the present invention. In step 1401, it is determined whether the RLC block is in error, and if not, at step 1402, a counter tallying the total number of blocks received since the start of the TBF is incremented. At step 1403, since the block was in error, both the counter tallying the total number of blocks received since the start of the TBF, and the counter tallying the total number of errored blocks received since the start of the TBF are incremented.

Update $\Gamma_{CH}$ for Quick ACK Procedure (Step 913)

Figure 15:
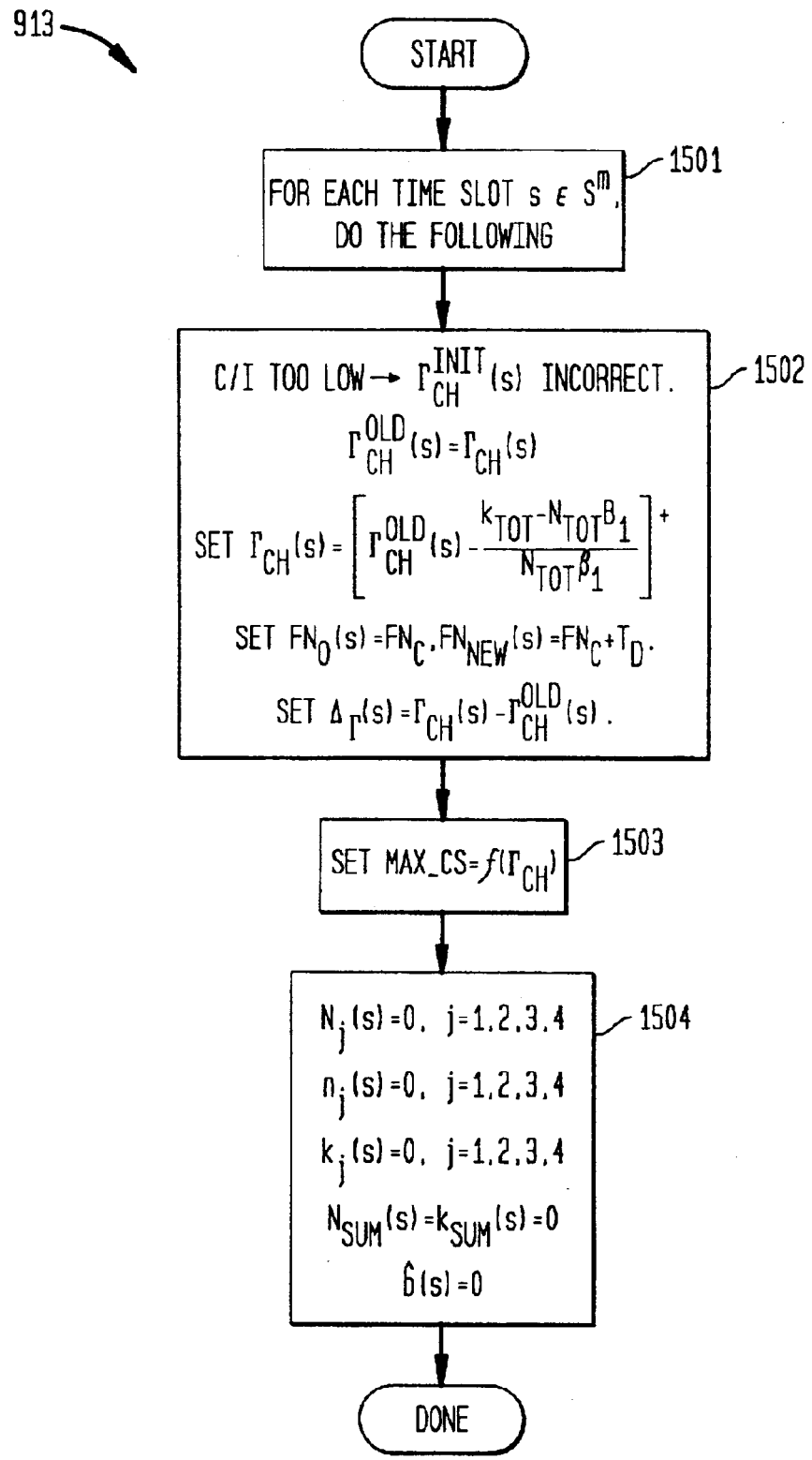
FIG. 15 illustrates the procedure used to determine the values of $\Gamma_{CH}$ for Quick ACK.

FIG. 15 illustrates the procedure used to determine the values of $\Gamma_{CH}$ for Quick ACK. When a Quick ACK is requested (step 1501), it is conservatively assumed that the power levels must be inadequate on all timeslots assigned to the mobile. Therefore, the $\Gamma_{CH}$ values will be updated for all timeslots assigned to the mobile. At step 1502, the values of $\Gamma_{CH}$ for each timeslot are updated using the BLER-based power step estimation algorithm. Changing the values of $\Gamma_{CH}$ on each timeslot will start a new measurement interval on each timeslot. At step 1503, $MAX\_CS=f(\Gamma_{CH})$ is set; this is the output of the uplink power control algorithm, which is described in further detail below. Thereafter, since a new measurement interval begins, counters for the measurement interval are initialized (step 1504).

Implementing Quick Ack

Figure 16:
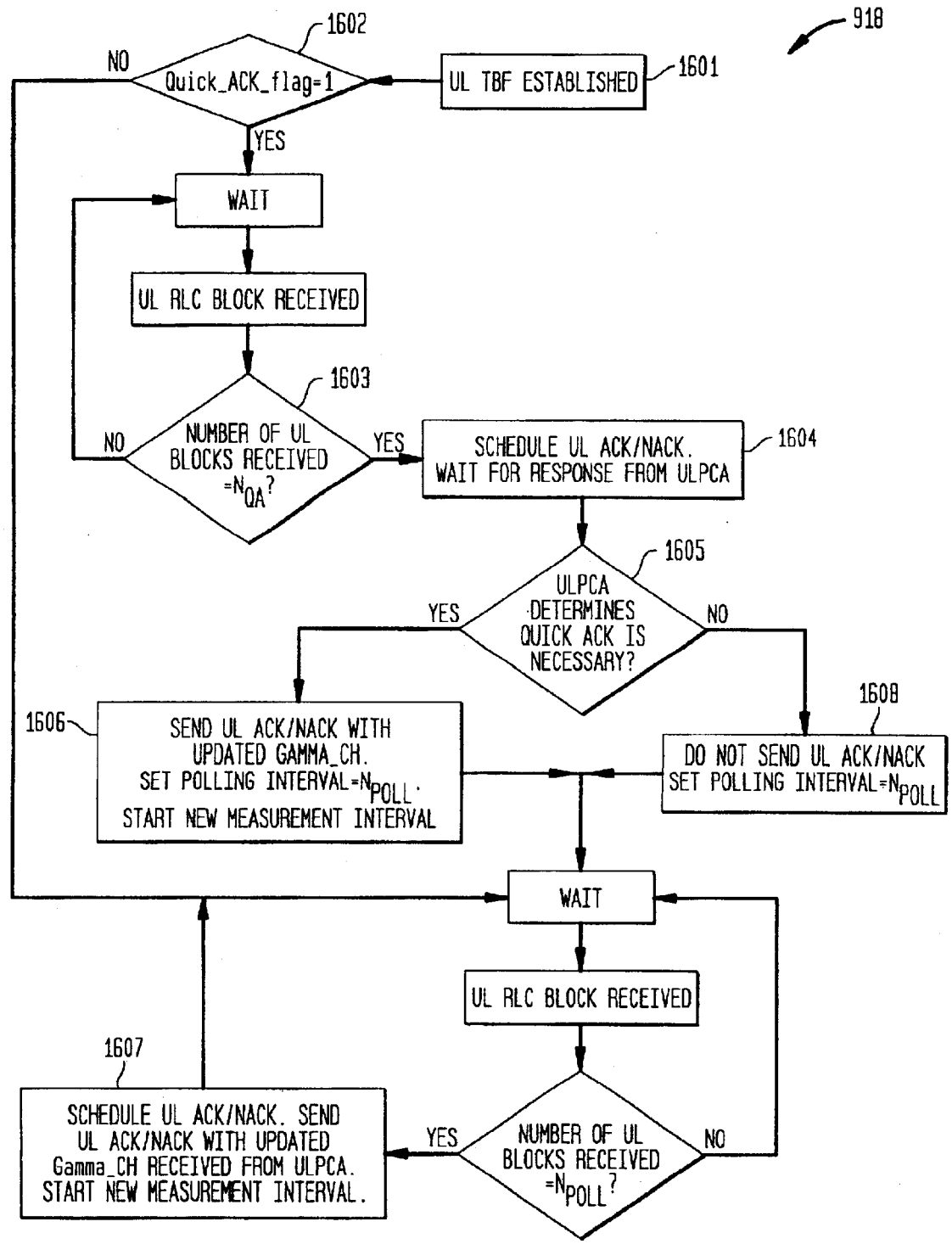
FIG. 16 illustrates one implementation of the Quick ACK procedure in accordance with the invention.

FIG. 16 illustrates one implementation of the Quick ACK procedure. Referring to FIG. 16, it is initially noted that the ULPCA does not schedule the Quick ACK. Instead, after a UL TBF is established (step 1601) and if the Quick ACK feature is ON (as is indicated at 1602 by the Quick_ACK_flag=1 in FIG. 16), then the rPCU schedules the Quick ACK UL ACK/NACK (step 1604) after $N_{QA}$ RLC blocks have been received (step 1603) from the mobile.

When this UL ACK/NACK is scheduled, the ULPCA determines if a Quick ACK is necessary (step 1605). If it is, then the rPCU sends (step 1606) the UL ACK/NACK with the value of $\Gamma_{CH}$ provided by the ULPCA. Thereafter, all UL ACK/NACKs are scheduled by the rPCU (step 1607) at the usual frequency, i.e., after every $N_{POLL}$ RLC blocks are received. If, on the other hand, the ULPCA determines that the Quick ACK is unnecessary, then the rPCU does not send the UL ACK/NACK (step 1608), and schedules an UL ACK/NACK after the first $N_{POLL}$ RLC blocks are received. Thereafter, all UL ACK/NACKs are scheduled (step 1607) as usual after every $N_{POLL}$ RLC blocks are received.

Update $\Gamma_{CH}$ Procedure (Step 918)

The Update $\Gamma_{CH}$ procedure decides whether enough information has been received over a measurement interval to adjust the values of $\Gamma_{CH}$ used on each timeslot used by the mobile station. If enough information on uplink performance has been received since the start of the measurement interval, new values of $\Gamma_{CH}$ are calculated and sent to the mobile in the RLC control message.

Calculating $\Gamma_{CH}$

The reliability of the values of $\Delta_{BER}(s)$ and $\Delta_{BLER}(s)$ obtained from the BER and BLER-based algorithms discussed previously depends on the variance of the BLER and BER estimates in a measurement interval. The variance, in turn, depends on the operating C/I point. For instance, at high C/I values (e.g., region C in FIG. 4), the variance of BER estimates is low, thereby making the BER-based algorithm preferable. On the other hand, at low C/I values (e.g., region A in FIG. 4), (a) BER has a high variance, and the estimates of BER are biased because BLER is high;

(b) The assumption that log(BER) is a linear function of C/I is no longer valid, (c) Block errors are more likely; and (d) BLER is a linear function of C/I (in dB).

This makes the BLER-based algorithm preferable at low C/I. These two regimes, namely high C/I and low C/I, can be distinguished by means of the observed BLER. Thus, at high C/I, BLER≅0, while at low C/I, BLER>BLER high, with very high probability.

The BER and BLER-based algorithms assume that the uplink C/I levels observed by the BTS remains constant throughout the duration of the measurement interval. Although this is a valid assumption for slow-moving mobiles and short measurement intervals, the uplink C/I levels observed by the BTS can change by several dB if the mobile is traveling at high speeds or the measurement interval is of the order of several hundreds of milliseconds. In order to account for this, we age the estimate of $\Delta(s)$ in proportion to the length of the measurement interval. Precisely, let $\Delta_{BER,BLER}(s)$=estimate of $\Delta(s)$ obtained by combining $\Delta_{BER}(s)$ and $\Delta_{BLER}(s)$. Then set $$\Delta(s) = \Delta_{BER,BLER}(s) - 2\frac{(FN_c - FN_o(s))}{T_a}.$$

Here $FN_c-FN_o(s)$ is the amount of time (in number of frames) which has elapsed since the last update of $\Gamma_{CH}(s)$, and $T_a$ is the amount of time (in number of frames) which would trigger a 2 dB increase in mobile power.

Figure 17A:
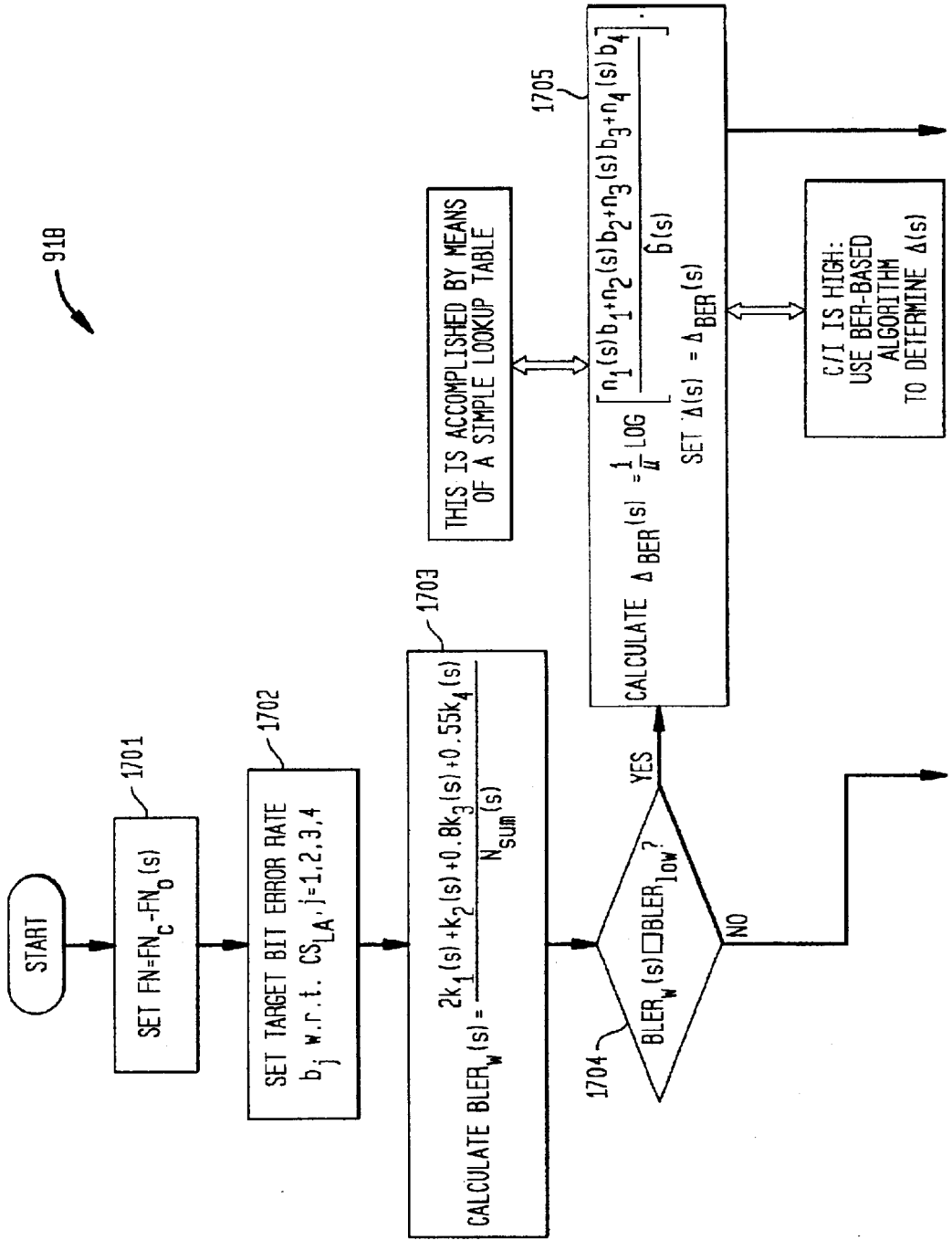
FIG. 17 illustrates the procedure used to calculate $\Gamma_{CH}$ in accordance with the invention.
Figure 17B:
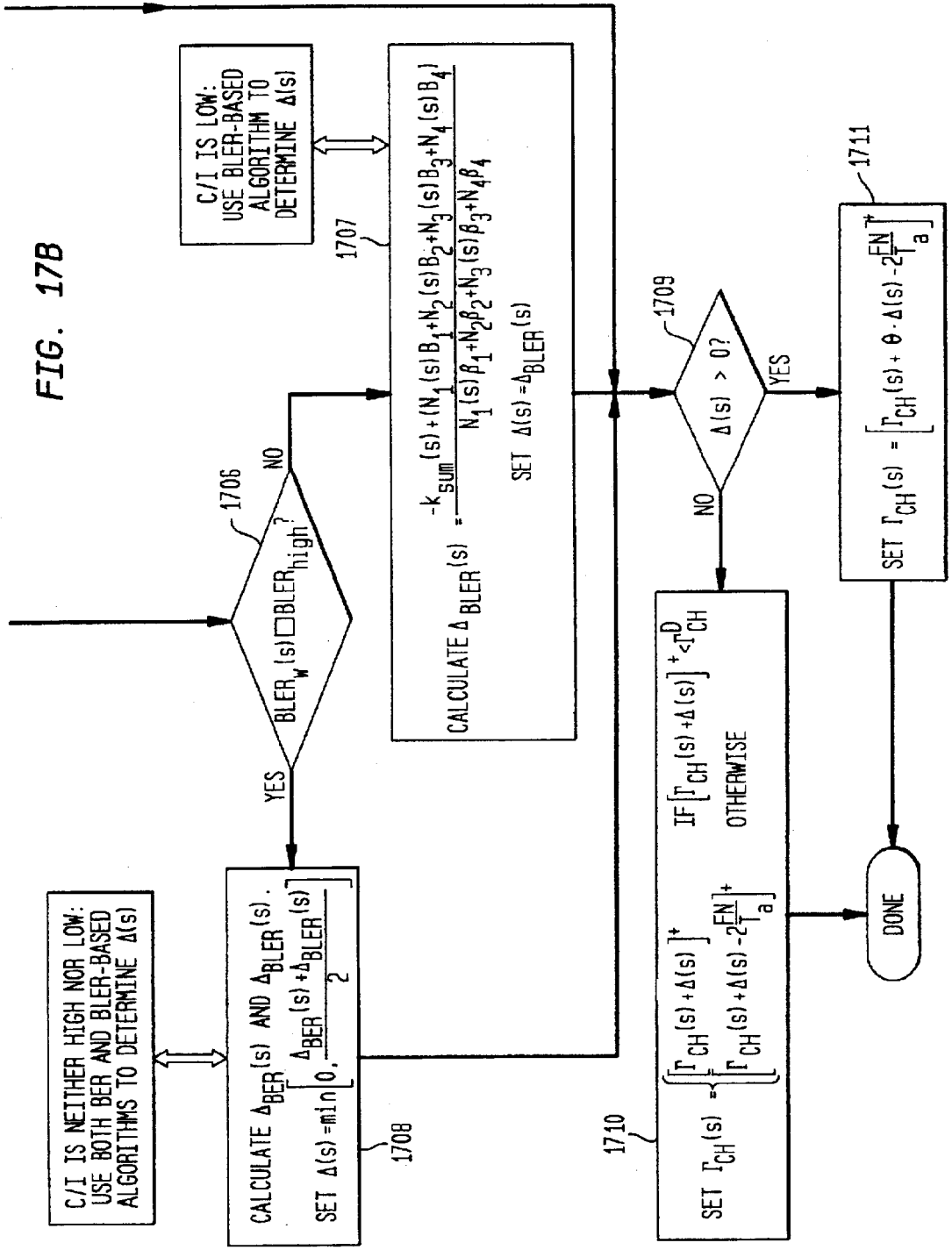

FIG. 17 illustrates the procedure used to calculate $\Gamma_{CH}$ in accordance with the invention. At step 1701, the values of all timeslot-specific counters are used to determine the change made to $\Gamma_{CH}$. At step 1702, target bit error rates for the uplink power control algorithm are set according to the output of the uplink link adaptation algorithm. The output $CS_{LA}$ of the uplink link adaptation algorithm corresponds to the weakest coding scheme for the new RLC blocks to be transmitted and those blocks to be retransmitted.

At step 1703, the weighted BLER is calculated. In the desired C/I region, CS-2 blocks are roughly twice, CS-3 blocks are roughly 1.25 times and CS-4 blocks are roughly $40/11$ times as likely to be in error compared to CS-1 blocks. This normalization gives an estimate of what the block error would have been if all blocks in a measurement interval were sent using CS-2. The weightings used in the algorithm for calculating $\Gamma_{CH}$ are tunable. Moreover, inventor simulations show that the performance of the algorithm is not sensitive to slightly different weightings as well.

As seen in step 1704, weighted block error rate is compared against $BLER_{low}$. If BLER is low, the algorithm assumes that it is operating in a high C/I regime, where ln(BER) is a roughly linear function of C/I. In this regime, the BER-based power step estimation procedure may be reliably used (step 1705) to determine the reduction in transmit power. The power reduction step is calculated using the BER-based power step estimation technique. The log( ) function can be implemented by means of a simple lookup table, instead of a CPU-intensive floating point operation.

Where the weighted block error rate is larger than BLERlow—the BER-based power step estimation procedure in step 1705 may not be very reliable. Accordingly, at step 1706, the algorithm is most likely operating within the desired C/I range. Neither the BER-based or BLER-based algorithms give particularly accurate estimates of the power step that should be used.

At step 1707, the weighted BLER is so high that the BLER-based power step estimation algorithm is used to determine how much uplink transmit power should be increased. The change in uplink transmit power is calculated using the BLER-based algorithm.

The average of the power steps predicted by the BER-based and BLER-based algorithms is calculated at step 1708. If the average suggests a decrease in power, the power step is conservatively set to 0. If the average suggests a power level increase, the step is set to the average value. The calculation at step 1709 determines that an increase in mobile transmit power is necessary. If the increase in power level would result in a power level above the level a fresh TBF would begin at, the power level is not aged (see step 1710). Otherwise, it is aged.

If the calculation has determined that a decrease in mobile transmit power is necessary at step 1709, the reduction in power level $\Delta(s)$ is decreased by the weighting factor $\theta$ (step 1711). The power level is further increased proportional to the amount of time that has elapsed since the start of the measurement interval.

Updating $\Gamma_{CH}$ on All Timeslots

The procedure used to determine new values of $\Gamma_{CH}$ must account for downlink reception delays as well as power ramping. To cope with these effects, $FN_{new}(s)$ which denotes the start of the measurement interval for mobile m on time slot s, is set as follows:

(a) If $|\Gamma old\Gamma_{old} - \Gamma new\Gamma_{new}| \leq 2$, then $|P - P_{old}| \leq 2$. In this case, the uplink power control algorithm can ignore the effect of downlink reception delay because the difference in the transmit powers is small (2 dB or less). Thus, set $FN_{new}(s) = FN_c$.

(b) If $|\Gamma_{new} - \Gamma_{old}| \geq 4$, then $P_{old}$, and consequently C/I, must have been very low or very high. Therefore, the UL RLC blocks received in the interval $(T_0, T_2)$ (see FIG. 12, for example) are very likely to experience high BLERs or low BERs, respectively. The uplink power control algorithm can account for this by calculating the next update of $\Gamma_{CH}(s)$ using expressions (8) and (11), or by selecting $\Delta_i(s)$ appropriately.

However, this poses two problems. First, the downlink reception delay is not fixed thereby making it difficult to estimate $\Delta_i(s)$. An error in estimating $\Delta_i(s)$ can lead to instability as well. Second, expressions (8) and (11) are more difficult to implement than their less complex counterparts in expressions (9) and (12), respectively. In view of these considerations (cf. FIG. 12), the uplink power control algorithm ignores all UL RLC blocks received in the interval $(T_0, T_2)$, and starts the next measurement interval after time $T_2$. So, set $FN_{new}(s) = FN_c + T_D$, where $T_D$ denotes an estimate of the downlink reception delay. Although ignoring these blocks makes the uplink power control algorithm slower, the algorithm is more accurate.

Figure 18:
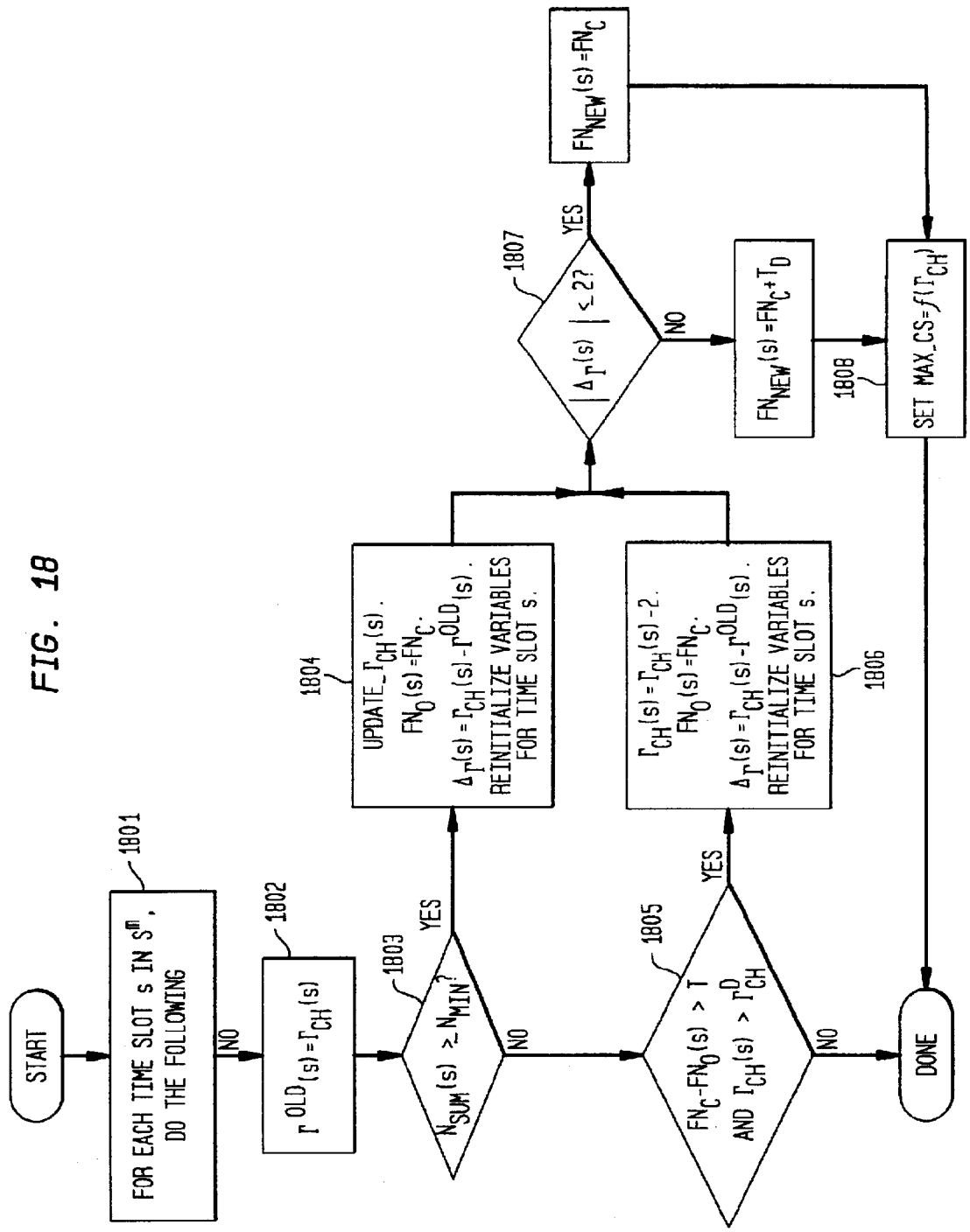
FIG. 18 illustrates the procedure for updating $\Gamma_{CH}$.

The procedure for updating $\Gamma_{CH}$ is described with reference to FIG. 18. The key is FIG. 18 denotes the re-initialization values for variables in FIG. 18. Referring to FIG. 18, at 1801 the update step must be done for every timeslot currently assigned to the mobile. At step 1802, the closed loop component of ULPCA is ON. The algorithm stores the value of $\Gamma_{CH}$ used over the current measurement interval in the parameter $\Gamma^{old}_{CH}(s)$.

Next it is determined at step 1803 whether enough blocks on timeslot s have been received to determine a new transmit power. If YES, then at step 1804 the value of $\Gamma_{CH}(s)$ is updated and the current frame number is recorded. Counters used to monitor link quality during a measurement interval are reset to the values specified in the key of FIG. 18. If the output of step 1803 is NO, then the algorithm determines if too much time has passed so that it is necessary to increase power (step 1805). If so, i.e., if at least T units of time have passed since the last update of $\Gamma_{CH}$, and the mobile is using a power level lower than the default power level used at the start of the TBF, then at step 1806 mobile power level is increased by 2 dB to account for the long measurement interval. The change in transmit power triggers a new measurement interval. Counters used to monitor link quality during a measurement interval are reset to the values specified in the key. If the output at step 1805 is NO, it has not been too long since the last update of $\Gamma_{CH}$; there is no need to increase power.

At step 1807 the power step is evaluated, If $|\Delta\Gamma(s)| = |\Gamma_{new}(s) - \Gamma_{old}(s)| \leq 2$, then set the new frame number for the next interval $FN_{new}(s) = FN_c$. If the output of step 1807 is NO, i.e., if $|\Delta\Gamma(s)| = |\Gamma_{new}(s) - \Gamma_{old}(s)| > 2$, then set $FN_{new}(s) = FN_c + T_D$. Finally the appropriate frame numbers are fed to be part of the output of the power control algorithm (step 1808).

Assign $\Gamma_{CH}$ for New Time Slots Procedure (Step 916)

Figure 19:
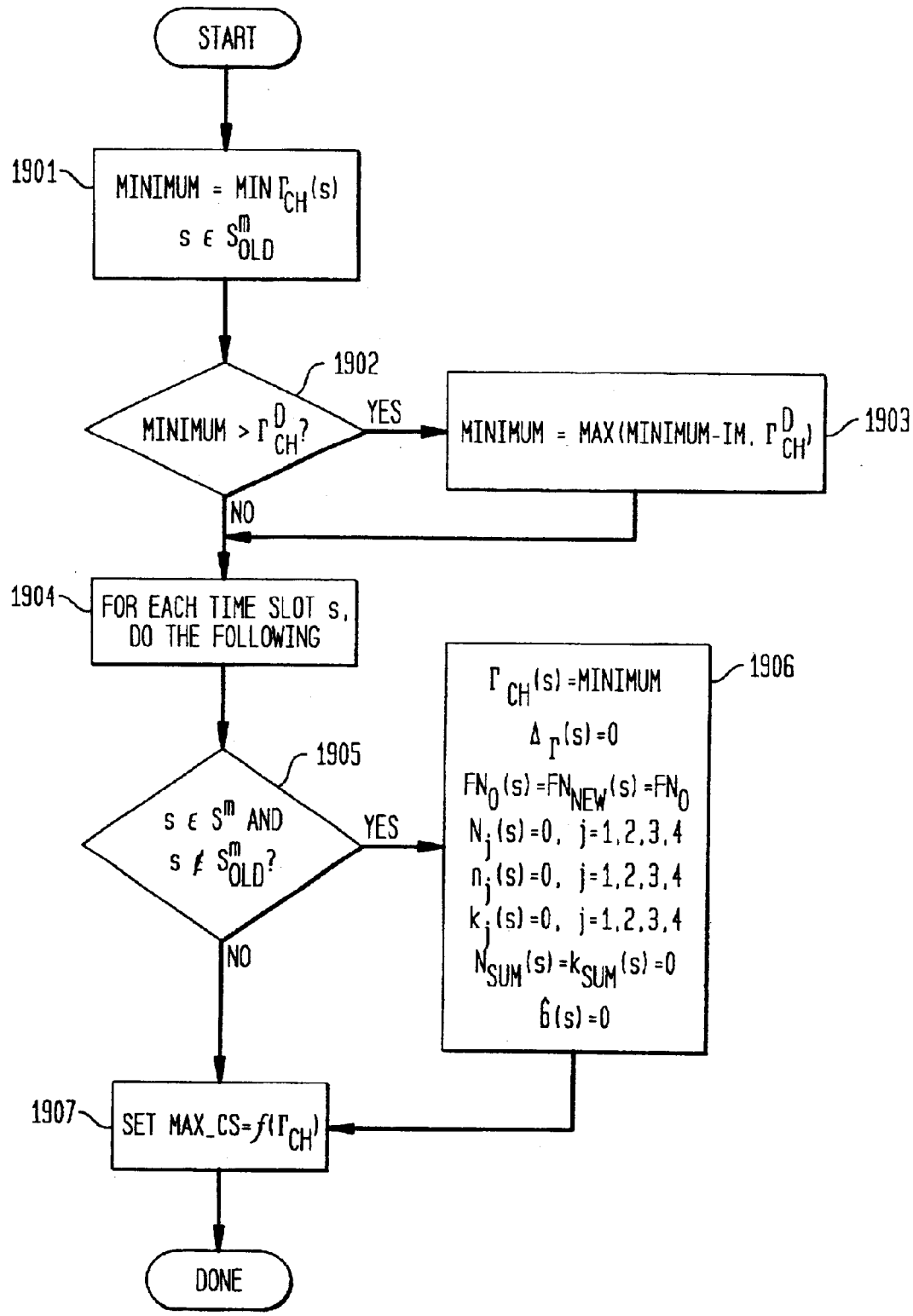
FIG. 19 illustrates the procedure used to assign values of $\Gamma_{CH}$ to new timeslots when the set of timeslots assigned to a mobile's uplink TBF changes.

FIG. 19 illustrates the procedure used to assign values of $\Gamma_{CH}$ to new timeslots when the set of timeslots assigned to a mobile's uplink TBF changes. At step 1901, the parameter "minimum" is assigned the value of $\Gamma_{CH}$ corresponding to the timeslot on which the mobile is using maximum transmit power. At step 1902 it is evaluated if this minimum is greater than a default value of $\Gamma_{CH}$ sent to the mobile. If so, then at step 1903 minimum is adjusted by an interference margin parameter IM. The parameter minimum now corresponds to a power level that is the maximum default power level used at the start of a TBF, the highest power used on timeslots previously assigned to the mobile, plus an interference margin of IM dB.

If minimum is less than the default value, new values of $\Gamma_{CH}$ are calculated for the slots now assigned to the mobile (step 1904). In a step 1905, if the timeslot assigned to the mobile was not part of the previous assignment, the mobile is assigned a transmit power corresponding to the parameter "minimum" just calculated, and the measurement interval parameters are reset for this timeslot (step 1906). However, if the output of step 1905 is NO, there is no need to change the $\Gamma_{CH}$ value for this timeslot since it was already assigned to the mobile. Finally, the output of the algorithm is set at step 1907.

Figure 20:
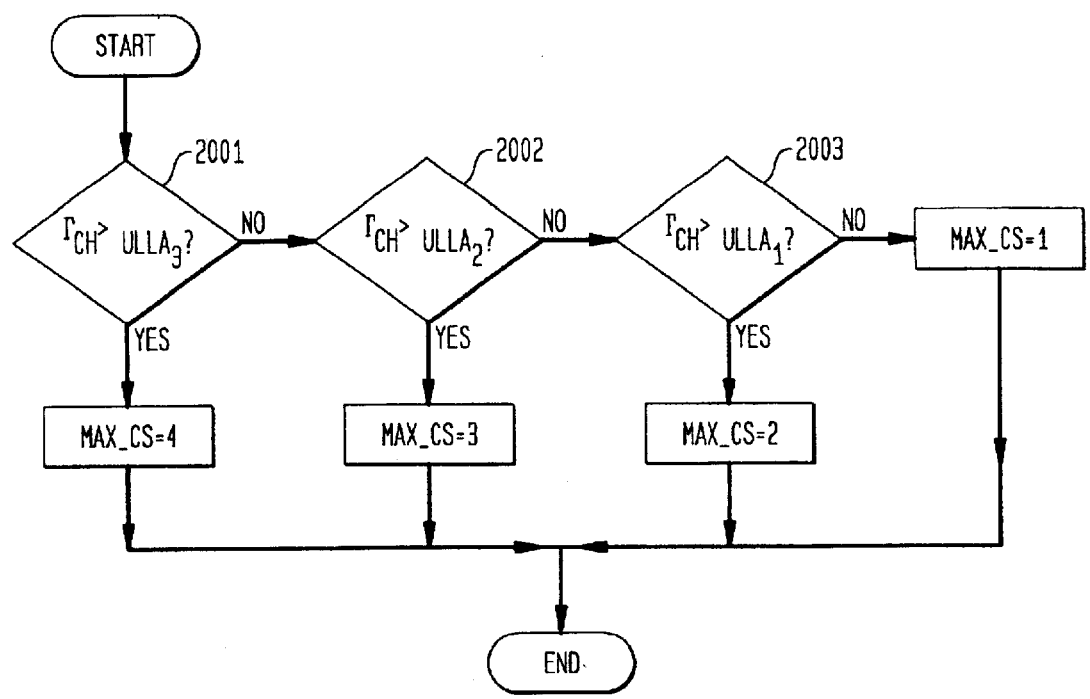
FIG. 20 illustrates the procedure for determining the highest rate code which may be assigned by the uplink adaptation algorithm of FIG. 2 in accordance with the invention.

FIG. 20 illustrates the procedure for determining the highest rate code that may be assigned by the uplink adaptation algorithm of FIG. 2 in accordance with the invention. This is essentially the output of the ULPCA. In particular, FIG. 20 depicts a MAX_CS table look up procedure. A series of comparisons are made in order to determine the output. For example, at step 2001 if $\Gamma_{CH} > \Gamma_{ULLA_3}$, the mobile station is allowed to use CS-1, CS-2, CS-3 and CS-4, and the ULPCA output is set to MAX_CS to 4. At step 2002, if $\Gamma_{ULLA_2} < \Gamma_{CH} \leq \Gamma_{ULLA_3}$, the mobile is allowed to use CS-1, CS-2 and CS-3 and ULPCA output MAX_CS is set to 3. Further, at step 2003 if $\Gamma_{ULLA_1} < \Gamma_{CH} \leq \Gamma_{ULLA_2}$, the mobile is only allowed to use CS-1 and CS-2, and ULPCA is set MAX_CS to 2. Thus, if $\Gamma_{CH} \leq \Gamma_{ULLA_1}$, the mobile station is only allowed to use CS-1, and the ULPCA sets MAX_CS=1.

Therefore, the present invention provides a method for improving uplink power control in GPRS systems. In the algorithm, the quality of an airlink is assessed over a series of successive measurement intervals. Each time an UL ACK/NACK message is sent to a mobile station, the algorithm evaluates whether enough uplink blocks have been transmitted by the mobile station since the start of the measurement interval. This is to determine the power level the mobile should be using.

If a determination can be made, power control parameters included in the ACK/NACK are updated, and a new measurement interval begins. If the interval has lasted too long, transmission of an uplink ACK/NACK message triggers the end of a measurement interval. In this case, the measurements taken over the measurement interval may no longer reflect the current quality of the channel. To compensate for this uncertainty, the mobile's transmit power is increased to at most a predetermined maximum power level, and a new measurement interval begins.

At the end of a measurement interval, the uplink power control algorithm uses both BER-based based and block error rate (BLER)-based power step estimation techniques to determine how much to adjust the mobile station's transmit power. When the calculated power step results in an increase in mobile transmit power, the mobile is commanded to increase its transmit power by the total step. When the power step results in a decrease in mobile transmit power, the algorithm commands the mobile to reduce its power by a fraction of the estimate. Reducing the transmit power by only a fraction of the estimated step provides an algorithm that is more robust to estimation errors and to short term fluctuations in channel quality.

As described above, the uplink power control algorithm of the present invention provides for lower co-channel interference between channels in the mobile station. Additionally, mobile station performance may be improved at the boundaries of a cell in which the mobile resides by use of the algorithm. Further, the algorithm of the present invention provides a potential increase in the capacity handled within a GPRS system.

The invention being thus described, it will be obvious that the same may be varied in many ways. The above-described algorithm has been described as comprised of several components, flowcharts or blocks, it should be understood that the uplink power control algorithm can be implemented in application specific integrated circuits, software-driven processor circuitry, or other arrangements of discrete components. Such variations are not to be regarded as a departure from the spirit and scope of the invention, and all such modifications as would be obvious to one skilled in the art are intended to be included within the scope of the following claims.

What is claimed is:

1. A method for determining an uplink transmit power level at which a mobile station transmits a current data block over a radio link to a base transceiver station, comprising:
    obtaining link quality measurements over a given measurement interval; and
    applying the link quality measurements to bit error rate (BER)-based and block error rate (BLER)-based power step calculation techniques to determine how much to adjust the mobile station's transmit power for transmitting the current block.

2. The method of claim 1, wherein the base transceiver station and mobile station are part of a general packet radio service (GPRS) system.

3. The method of claim 1, further comprising transmitting the current block at the adjusted transmit power level.

4. The method of claim 1, wherein the method employs no timers, but is driven or initiated by at least one external event selected from the group comprising temporary block flows (TBF), receipt of an uplink block of data, transmission of a packet uplink acknowledgement/negative acknowledgement message, transmission of a TBF reassignment message, and termination of a TBF.

5. The method of claim 1, wherein applying further includes implementing an expediting procedure to more quickly determine the initial uplink transmit power of the mobile station by monitoring the quality of the first several uplink blocks sent on a temporary block flow (TBF), in order to determine if the initial uplink transmit power commanded by the base transceiver station at the start of the TBF is too low.

6. The method of claim 5, wherein the expediting procedure is controlled by a single flag indicating whether the expediting procedure is enabled or not.

7. The method of claim 1, wherein each time a message is sent to the mobile station, it is evaluated whether a specified number of uplink blocks have been transmitted by the mobile station since the start of the measurement interval.

8. The method of claim 1, wherein the BER-based power step, $\Delta_{BER}(s)$, which represents the excess power being used by the mobile station, is determined for each mobile station uplink temporary block flow (TBF) on a time slot s.

9. The method of claim 1, wherein $\Delta_{BER}(s)$ is determined from the following equation:

$$\Delta s = \frac{1}{\mu} \log\left(\frac{n_1(s)b_1 + n_2(s)b_2 + n_3(s)b_3 + n_4(s)b_4}{\hat{b}(s)}\right),$$

where $\mu$ represents a slope of a log(BER) versus C/I (dB) plot at time slot s, $\hat{b}(s)$ represents the expected number of bit errors in a given measurement interval at time slot s, $n_j(s)$ represents the number of RLC blocks received from the mobile station on time slot s that which were not in error, and $b_j(s)$ is the target number of bit errors per RLC block for the mobile station at time slot s.

10. The method of claim 1, wherein the BLER-based power step, $\Delta_{BLER}(s)$, which represents the excess power being used by the mobile station, is determined for each mobile station uplink TBF on a time slot s.

11. The method of claim 10, wherein $\Delta_{BLER}(s)$ is determined from the following equation:

$$\Delta(s) = \frac{-k_{sum}(s) + (N_1(s)B_1 + N_2(s)B_2 + N_3(s)B_3 + N_4(s)B_4)}{N_1(s)\beta_1 + N_2(s)\beta_2 + N_3(s)\beta_3 + N_4(s)\beta_4},$$

where $k_{sum}(s)$ is the total number of RLC blocks received from the mobile station on time slot s which were in error, $N_j(s)$ represents the number of RLC blocks received from the mobile station on time slot s during the measurement interval, $B_j(s)$ is the target block error rate for the mobile station at time slot s, and $\beta_j$ represents the slope of a BLER versus C/I (dB) plot at time slot s.

12. The method of claim 1,
    wherein if a calculated power step results in an increase in mobile transmit power, the mobile is commanded to increase its transmit power by the total power step, and
    wherein if the calculated power step results in a decrease in mobile transmit power, the mobile is commended to reduce its power by a fraction of the calculated power step.

13. The method of claim 12, wherein reducing the transmit power by only a fraction of the calculated step provides a method that is robust to estimation errors and to short term fluctuations in channel quality of the mobile station.

14. The method of claim 1, wherein obtaining further includes assessing the quality of individual RLC blocks received from the mobile station in the base transceiver station, and if the quality is substantially poor within a first polling interval, sending a message commanding a higher mobile transmit power from the mobile station.

15. The method of claim 14, wherein assessing further includes determining whether to send a message or not by determining whether the total number of block errors in the RLC blocks is greater than or equal to a given parameter, and if so, sending a message commanding higher mobile transmit power from the mobile station.

16. A base transceiver station (BTS) in a general packet radio system (GPRS), comprising:

a transceiver for transmitting and receiving data packets to and from a plurality of mobile stations; and a processor which determines the uplink transmit power to be used by at least one mobile station before transmitting its uplink block to the transceiver of the BTS, the processor including a power control application which obtains link quality measurements from a radio link established between a mobile station and the BTS over a given measurement interval, and which applies the link quality measurements to bit error rate (BER)-based and block error rate (BLER)-based powet step calculation techniques to dtermine how much to adjust the mobile station's transmit power.

17. The method of claim 16, wherein each time a message is sent to the mobile station, it is evaluated whether a specified number of uplink blocks have been transmitted by the mobile station since the start of the measurement interval.

18. The base transceiver station of claim 16, wherein if a calculated power step results in an increase in mobile transmit power, the processor sends a command to the mobile station to increase its transmit power by the total power step, and wherein if the calculated power step results in a decrease in mobile transmit power, the processor sends a command to the mobile station to reduce its power by a fraction of the calculated power step.

19. The base transceiver station of claim 16, wherein said power control application assesses the received quality of individual RLC blocks received from the mobile stations and if the quality is substantially poor within a first polling interval, the processor sends a message commanding a higher mobile transmit power from the mobile station.

20. The base transceiver station of claim 16, wherein the power control application employs no timers, but is driven or initiated by at least one external event selected from the group comprising temporary block flows (TBF), receipt of an uplink block of data, transmission of a packet uplink acknowledgement/negative acknowledgement message, transmission of a TBF reassignment message, and termination of a TBF.

21. The base transceiver station of claim 16, wherein the BER-based power control step $\Delta_{BER}(s)$, which represents the excess power being used by the mobile station, is determined for each mobile station uplink TBF on a time slot s.

22. The base transceiver station of claim 21, wherein $\Delta_{BER}(s)$ is determined from the following equation:

$$\Delta(s) = \frac{1}{\mu} \log\left(\frac{n_1(s)b_1 + n_2(s)b_2 + n_3(s)b_3 + n_4(s)b_4}{\hat{b}(s)}\right),$$

where $\mu$ represents a slope of a log(BER) versus C/I (dB) plot at time slot s, $\hat{b}(s)$ represents the expected number of bit errors in a given measurement interval at time slot s, $n_j(s)$ represents the number of RLC blocks received from the mobile station on time slot s that which were not in error, and $b_j(s)$ is the target number of bit errors per RLC block for the mobile station at time slot s.

23. The base transceiver station of claim 16, wherein the BLER-based power control step $\Delta_{BLER}(s)$, which represents the excess power being used by the mobile station, is determined for each mobile station uplink TBF on a time slot s.

24. The base transceiver station of claim 23, wherein $\Delta_{BLER}(s)$ is determined from the following equation:

$$\Delta(s) = \frac{-k_{sum}(s) + (N_1(s)B_1 + N_2(s)B_2 + N_3(s)B_3 + N_4(s)B_4)}{N_1(s)\beta_1 + N_2(s)\beta_2 + N_3(s)\beta_3 + N_4(s)\beta_4},$$

where $k_{sum}(s)$ is the total number of RLC blocks received from the mobile station on time slot s which were in error, $N_j(s)$ represents the number of RLC blocks received from the mobile station on time slot s during the measurement interval, $B_j(s)$ is the target block error rate for the mobile station at time slot s, and $\beta_j$ represents the slope of a BLER versus C/I (dB) plot on time slot s.

25. The base transceiver station of claim 16, wherein the power control application includes an expediting procedure to more quickly determine the initial uplink transmit power of the mobile station by monitoring the quality of the first several uplink blocks sent on a temporary block flow (TBF) in order to determine if the initial uplink transmit power commanded by the base transmitter station at the start of the TBF is too low.

26. The base transceiver station of claim 25, wherein the power control application controls the expediting procedure based on a single flag indicating whether the expediting procedure is to be enabled or not.

27. In a general packet radio system (GPRS), a closed-loop power control method requiring interaction between a first algorithm and a second algorithm, wherein the first algorithm informs the second algorithm about a weakest coding scheme that is to be used over an airlink, in a next measurement interval, between at least one target mobile station and a base station of the system, and wherein the second algorithm selects target mobile bit error rate (BER) or target mobile carrier-to-interference level (C/I) based on the information from the first algorithm, and sets a flag for when attenuation to be used in said next measurement interval exceeds a preset threshold.

28. The closed-loop power control method of claim 27, wherein the method maintains uplink channel BER of the mobile within a desired range by commanding the target mobile to decrease its transmit power where target BER is below the desired range, and by commanding the target mobile to increase its transmit power where target BER is above the desired range.

29. The closed-loop power control method of claim 27, wherein said coding schemes used by the first algorithm are selected from one of CS-1, CS-2, CS-3 and CS-4 GPRS coding schemes.

30. The closed-loop power control method of claim 29, wherein a set flag indicates that target mobile transmit power is low, so that the first algorithm uses high throughput coding schemes CS-3 and CS-4.

31. The closed-loop power control method of claim 29, wherein an unset flag indicates that target mobile transmit power is high, so that the first algorithm is limited to low throughput coding schemes CS-1 and CS-2.

\* \* \* \* \*